(12) United States Patent
Haught

(10) Patent No.: US 11,065,092 B2
(45) Date of Patent: *Jul. 20, 2021

(54) PROTECTIVE DEVICE FOR THE HEAD AND EARS OF AN ANIMAL

(71) Applicant: Julie Anne Haught, Boise, ID (US)

(72) Inventor: Julie Anne Haught, Boise, ID (US)

( * ) Notice: Subject to any disclaimer, the term of this patent is extended or adjusted under 35 U.S.C. 154(b) by 374 days.

This patent is subject to a terminal disclaimer.

(21) Appl. No.: 15/940,713

(22) Filed: Mar. 29, 2018

(65) Prior Publication Data

US 2019/0099251 A1 Apr. 4, 2019

Related U.S. Application Data

(63) Continuation of application No. 14/722,457, filed on May 27, 2015, now Pat. No. 9,931,190.

(60) Provisional application No. 62/003,356, filed on May 27, 2014.

(51) Int. Cl.
*A61D 9/00* (2006.01)
*A01K 13/00* (2006.01)

(52) U.S. Cl.
CPC .............. *A61D 9/00* (2013.01); *A01K 13/006* (2013.01)

(58) Field of Classification Search
CPC ........ A61D 9/00; A01K 13/006; A42B 1/066; A42B 1/068
See application file for complete search history.

(56) References Cited

U.S. PATENT DOCUMENTS

| | | |
|---|---|---|
| 58,081 A | 9/1866 | Elveena |
| D41,745 S | 9/1911 | Orioli et al. |
| 1,489,145 A | 4/1924 | O'Keefe |
| 2,021,144 A | 11/1935 | Beck |
| 2,136,155 A | 11/1938 | McCaleb |
| 2,405,326 A * | 8/1946 | Plotsky .................. A61F 11/06 2/209 |
| 3,104,508 A | 9/1963 | O'Hare, Jr. |

(Continued)

FOREIGN PATENT DOCUMENTS

| | | | |
|---|---|---|---|
| CA | 2893251 C | 10/2016 | |
| WO | WO-03086121 A2 * | 10/2003 | ............. A41D 15/00 |

OTHER PUBLICATIONS

Photos of prior art Collar, Pillow, and Wrap, at least as early as May 1, 2014.

*Primary Examiner* — Magdalena Topolski
(74) *Attorney, Agent, or Firm* — Pedersen & Company, PLLC; Ken J. Pedersen; Barbara S. Pedersen

(57) ABSTRACT

A protective cover device for an animal's head includes a first portion for securement around the animal's neck, behind the occiput and at or near the smallest diameter of the neck, and a second portion for covering the animal's ears that is fastened forward of said first portion and at or near the throat or jaw of the animal. The device may be a flexible/generally-flexible panel with supplemental shaping, stiffening, and/or adjustment systems to cup/fit the ears, to prevent the ears from sliding out of the device, and/or to prevent foreign objects such as cheat-grass or fox-tail, ticks, or insects from reaching the ears. Stiffeners may be added along or beside the central axis, around the front edge, and/or near the animal's ears, to shape and hold the second portion in a configuration protective of the animal ears and not easily rolled-up or pushed off by a paw/foot.

29 Claims, 11 Drawing Sheets

(56) References Cited

U.S. PATENT DOCUMENTS

| | | | |
|---|---|---|---|
| 4,110,846 A * | 9/1978 | Hernandez | A41D 23/00 |
| | | | 2/203 |
| 4,221,189 A | 9/1980 | Olvera | |
| D281,028 S * | 10/1985 | Nichols | D30/145 |
| 5,163,272 A | 11/1992 | Finley et al. | |
| 5,456,215 A | 10/1995 | Deutscher et al. | |
| 5,713,188 A | 2/1998 | Chisholm | |
| 6,200,585 B1 | 3/2001 | Voelz | |
| 6,314,961 B1 | 11/2001 | Barnes | |
| 6,789,266 B1 | 9/2004 | Mills et al. | |
| 7,406,816 B2 | 8/2008 | Andrews | |
| 7,946,256 B2 | 5/2011 | Mann | |
| 8,833,311 B2 | 9/2014 | Kostelec | |
| 9,931,190 B2 | 4/2018 | Haught | |
| 2002/0043219 A1 | 4/2002 | Rice | |
| 2002/0124812 A1 | 9/2002 | Sjolin | |
| 2003/0177984 A1 * | 9/2003 | Newman | A41D 13/00 |
| | | | 119/850 |
| 2008/0121193 A1 | 5/2008 | Stampoltzis | |
| 2008/0216211 A1 | 9/2008 | Dolby | |
| 2009/0178628 A1 | 7/2009 | Carmean et al. | |
| 2010/0192871 A1 | 8/2010 | Winestock | |
| 2010/0307427 A1 | 12/2010 | Mann | |
| 2016/0360727 A1 | 12/2016 | Weber | |
| 2019/0216153 A1 * | 7/2019 | Derr | A42B 1/206 |
| 2019/0313606 A1 * | 10/2019 | Kok-Duson | A01K 13/006 |

* cited by examiner

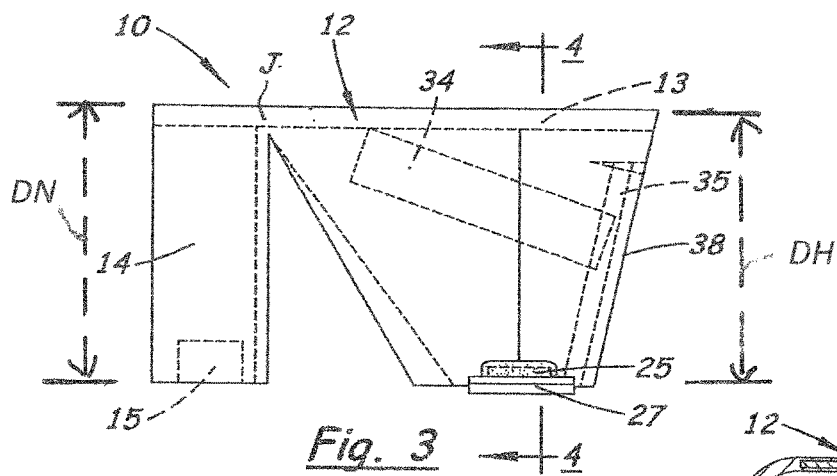
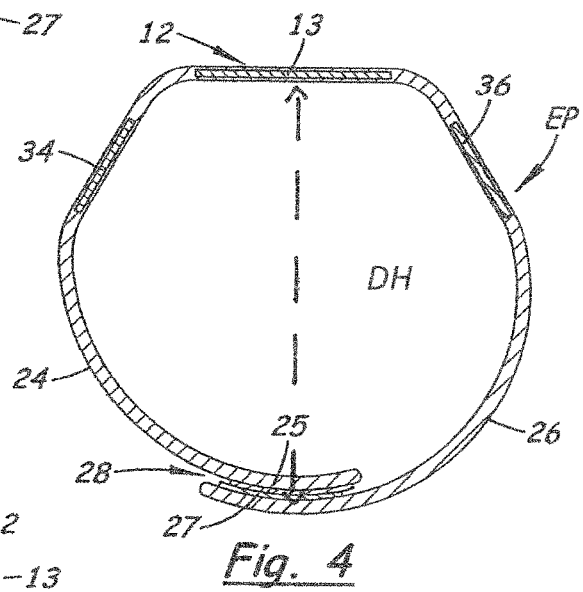
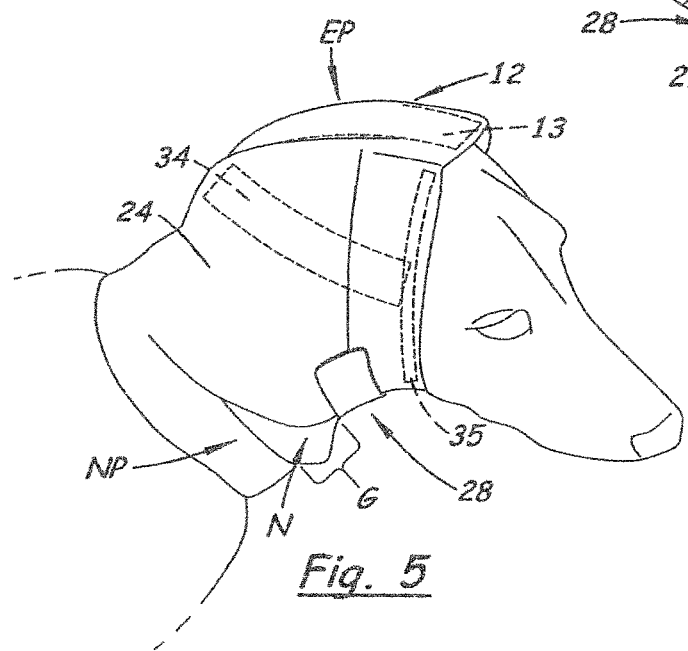

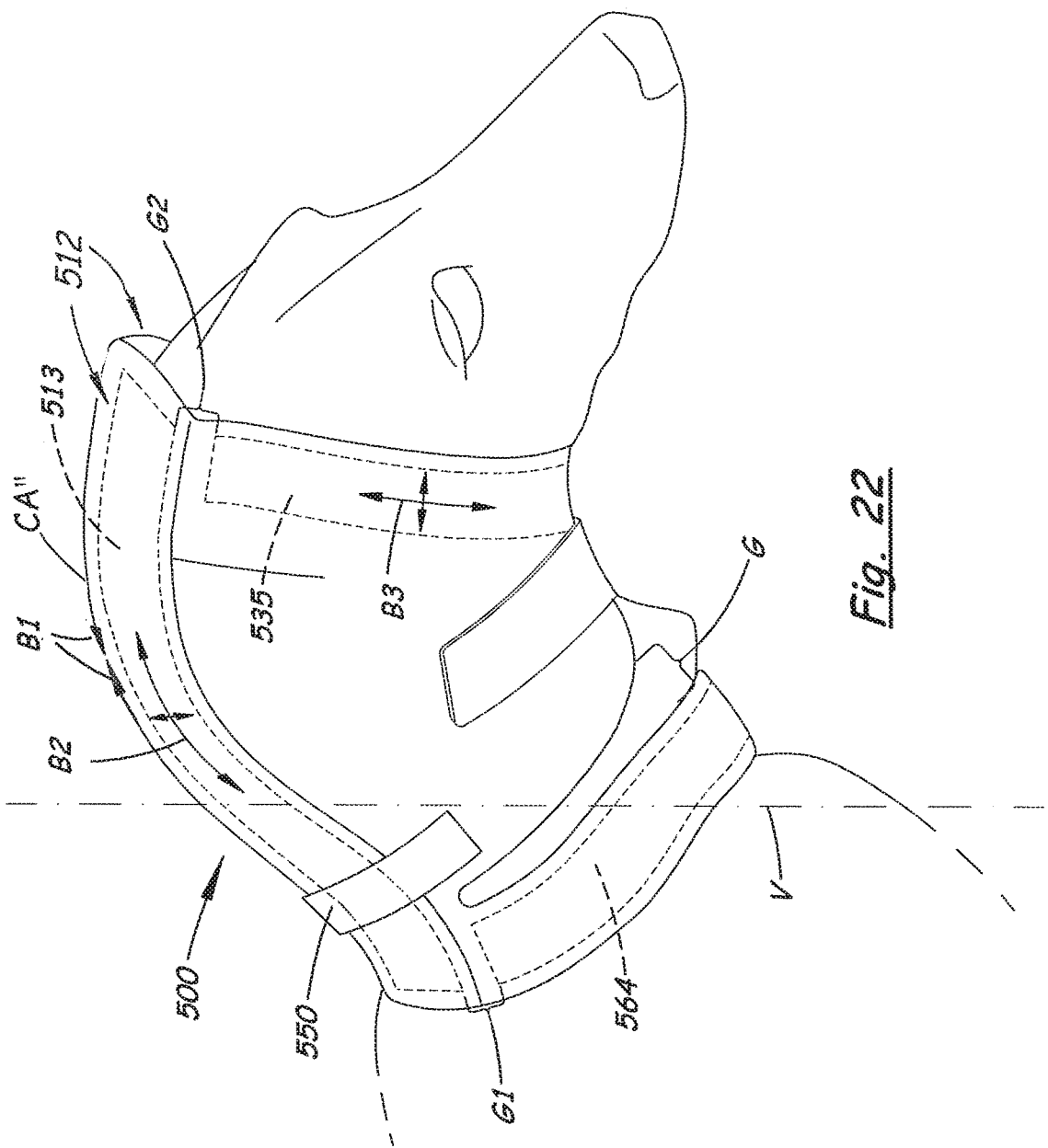

PROTECTIVE DEVICE FOR THE HEAD AND EARS OF AN ANIMAL

This application is a Continuation of U.S. Non-Provisional application Ser. No. 14/722,457, filed May 27, 2015, entitled "Protective Device for the Head and Ears of an Animal", and issuing Apr. 3, 2018 as U.S. Pat. No. 9,931,190, which claims priority of U.S. Provisional Application Ser. No. 62/003,356, filed May 27, 2014 and entitled "Protective Device for Use After Injury or Surgery on Dog Ears", the entire disclosure of the Provisional Application being incorporated herein by this reference.

BACKGROUND OF THE INVENTION

Field of the Invention

The invention relates to a protector for a portion of an animal's head. For example, the protector may cover a dog's ears after surgery or injury so that the ears will be shielded from the environment and the dog's own actions, such as shaking, kicking, or scratching, and will heal more quickly than if left uncovered. The protector may also or instead be used to protect a dog's ears from ear-bites by other dogs, for example, at a dog park or a kennel. The protector may also or instead be used to protect a dog's ears from injury, for example, during times of confinement in a kennel or cage where a hematoma or other damage may occur during rubbing or impact against the bars or other structure of such a kennel/cage. Alternatively, the protector may also or instead be used as a preventative device, to keep cheat-grass, fox-tail, seeds, burs, ticks or other arachnids, or insects away from the ears or other portions of the head of the animal. Dog owners, hunters, veterinarians, kennel operators, joggers, outsdoorsmen/women, and others who care for dogs or other animals, may benefit from using the device on a dog or other animal as a protective and/or preventative device.

Related Art

Veterinarians typically provide devices to dog owners, after surgery or injury on or in the vicinity of the dog's ears, to discourage the dog from pawing or kicking the affected or injured area(s). These devices are typically a "doughnut-shaped" pillow or blown-up ring, which is installed around the dog's neck and is so large that the dog cannot kick around the doughnut device to reach the affected or injured area. Such a doughnut-shaped device has an outer diameter that is a multiple of the diameter of the dog's neck, and, hence, can be quite annoying or uncomfortable for the dog, especially when the dog wishes to lie down or sleep. Another common device provided after surgery or injury is the Elizabethan collar, the so-called "cone of shame", that is installed around the dog's neck, and flares outward and forward far beyond the dog's head. Again, such a "cone" has an outer diameter that is a multiple of the diameter of the dog's neck and is annoying and/or uncomfortable. Because of the annoyance or discomfort, many dogs will typically try to remove the doughnut or cone, and, even if they do not succeed, it becomes a troublesome and worrying problem for the dog and the owner.

Neither of these commonly-used devices is very effective, and especially is not effective in limiting or preventing ear "flapping" such as is caused by shaking of the head, for example. Thus, such devices have limited utility, and can cause slow-healing and/or re-injury of the ear flaps. Neither of these devices is an effective preventative device for keeping cheat-grass, fox-tail, seeds, burs, ticks or other arachnids, or insects away from the ears or other portions of the head of the animal.

Smaller and less obtrusive protective devices have been used, but also have limited utility and effectiveness. For example, stocking-caps have been used on dogs, with the hope that the hat will cover and cushion the affect or injured ear(s) and that the dog will cooperate by wearing the hat. Also, cloth or knit tubes or wraps have been stretched and/or otherwise installed over the dog's head, by pulling the tube rearward over the dog's face, or simply wrapping a fabric strip around the dog's head, to cover the ear area. Such attempts typically result in the dog quickly pawing the hat, tube, or wrap off of his neck and head. A few swipes of a paw will typically knock off the hat, or roll up the tube or wrap, to the point where it falls off in the forward direction or rolls rearward off of the ears.

In the patent literature, several devices may be seen for covering or controlling an animal's ears. For example, Olvera U.S. Pat. No. 4,221,189 discloses a cup and frame system for newly-cropped dog ears. Barnes U.S. Pat. No. 6,314,961 discloses a strap and frame system for new-cropped dog ears. As the purpose of such devices is to encourage the remaining ear portion to extend upright, such devices extend several inches above the dog's head and support the remaining ear portions. Carmean, et al. Publication No. 2009/0178628 discloses a compressive head-band for placement around the dog's head, in a similar manner as described above for the cloth or knit tube. The compressive force of the Carmean head-band may be used to hold the ear back, away from the ear canal. Deutscher, et al.'s U.S. Pat. No. 5,456,215 discloses a cover for an animal's head, with eye-holes for placement around the animal's eyes, wherein the cover extends all the way from near the nose to the shoulders. Mann's U.S. Pat. No. 7,946,256 discloses a cover to protect the ears from cheat-grass, with an inner shell having ear-slits into and through which the dog's ears are placed, and an outer shell that lays over the inner shell covering the ears as they protrude through the inner shell.

The inventor is not aware of any prior art dog ear protective coverings that are effective, safe, easy-to-install, comfortable for a dog during installation, and comfortable for the dog to wear over extended periods of time, including lying down and sleeping. The inventor is not aware of any prior art economical and effective device for limiting or preventing "ear flapping" that is so problematic for injured or healing ears. The present invention meets multiple or all of these needs.

SUMMARY OF THE INVENTION

The invention comprises a protective cover device for a portion of an animal's head, wherein the device comprises a first portion for securement around the animal's neck, behind the occiput and at or near the smallest diameter of the neck, and a second portion for covering a forward portion of the animal's head. Preferably, the second portion covers the animal's ears and is fastened forward of said first portion and at or near the throat or jaw of the animal. The first and second portions may be connected together as parts of a generally flat panel that is flexible or generally flexible for being wrapped around the neck and the occiput-ear-cheek region, respectively. The first portion snuggly fitting around the animal's neck secures the device to the animal's head and prevents the device from easily or accidentally being removed. The second portion preferably covers, cups, and/or mildly compresses the animal's ears, in order 1) to shield surgery-affected or injured head/ear(s) and to retain them substantially or entirely in their natural positions with limited or minimal movement relative to the head of the animal, and/or 2) to cover the head/ears for preventing foreign objects, such as cheat-grass or other plant matter, ticks or other arachnids, or insects, from reaching/entering the head/ears. The second portion is adapted in certain embodiments to be used on a dog, and to fit closely or tight enough 1) to limit or prevent movement of the ear flaps (pinna) caused by the animal's own movement or other causes, because "flapping" of the ears may be harmful during healing from surgery or injury and/or 2) to limit or prevent invasion of said foreign objects onto/into the head/ears.

Preferably the device comprises or consists essentially of a single panel shaped so that said first portion is connected to the second portion at a relatively narrow junction at or near a central axis, with both first and second portions extending separately from each other away from said junction mainly transversely to the central axis, so that right and left straps or wings of each of the portions are fastenable to form substantially separate, forward and rearward loops/wraps. Supplemental shaping and/or adjustment of the device may be done to cup and/or fit the ears well, and/or to prevent the ears from sliding out from under the device. Supplemental shaping and/or adjustment may include providing cupped-shaped ear regions in the second portion by sewing, gathering, or other forming techniques. Supplemental shaping and/or adjustment may include providing supplemental stiffened regions or stiffeners, preferably along or beside the central axis, and in certain embodiments around the front edge of the device and/or in the ear regions, to shape and/or hold the second portion in a configuration that is protective of the animal ears and that cannot be easily rolled-up, scrunched-up, or pushed off by the animal's paw/foot. Supplemental shaping and/or adjustment may comprise independent adjustment of the tightness of each of the forward and rearward loops/wraps, for example, by providing adjustable and/or moveable fasteners. Supplemental shaping and/or adjustment may comprise adjustment of the front-to-rear length and/or side-to-side width of the device to fit a variety of animal heads.

BRIEF DESCRIPTION OF THE DRAWINGS

FIG. 3 is a side view of the embodiment of FIGS. 1 and 2, folded/wrapped and fastened into a configuration much as it would be worn by an animal.

FIG. 4 is a cross-sectional front view of the embodiment of FIGS. 1-3, viewed along the line 4-4 in FIG. 3.

FIG. 5 is a perspective view of the embodiment of FIGS. 1-4, being worn by a dog.

FIG. 22 is a side perspective view of the embodiment of FIG. 21, installed on a dog's head.

DETAILED DESCRIPTION OF PREFERRED EMBODIMENTS

Referring to the Figures, there are shown several, but not the only, embodiments of the invented protection device for animals, which comprise a first portion for securement to the animal neck, and a second portion for securement to the animal head forward of the neck. The first portion is preferably an integral portion of the main body (or main panel), and may be called a "neck portion" or alternatively a "collar". The second portion preferably is also an integral portion of the main body (or main panel), and may be called an "ear portion", or alternatively a "head portion" or "hood". The neck portion is preferably flexible and bendable, so as to be wrappable and tightenable around the neck of the animal. The ear portion is preferably also flexible and bendable (or substantially flexible and bendable) to an extent that it may be wrappable and fastenable around the animal's head at or near the ears. Included in "substantially flexible and bendable" in certain embodiments is that the ear portion may comprise stiffeners or other rigidizing portions that are relatively stiff compared to the flexible and bendable main body of the device, and that resiliently urge the device into the desired shape, for desired containment/shielding of the ears and/or to prevent rolling-up or "scrunching" of the ear portion, off of the ears or head, by the animal.

Certain embodiments may comprise the ear portion of the device being a pre-shaped, generally-inflexible hood at its top and sides, with flexible straps or other extensions to fasten the hood at the throat/jaw of the animal. Such pre-shaped, generally-inflexible embodiments are less preferred, however, because fitting such a device to various animals would be more difficult than fitting the flexible or substantially-flexible embodiments, and because such devices would be less-soft and less-comfortable.

Certain embodiments of the device may be sewn or otherwise formed, from fabric, polymeric, or other sheet materials, into a one or multi-layer construction taking the general shape of a single panel that is, at least in part, flexible and bendable. For example, an easily-washed and durable fabric may be used. Said panel may have pockets, inserts, hook and loop fastener additions, appliques or other multi-layer portions, tucks, gathers, and seams, if desired to create cupping of the ears and/or shape and position control; still, many embodiments may be described as a single, generally-planar panel.

Figure 1:
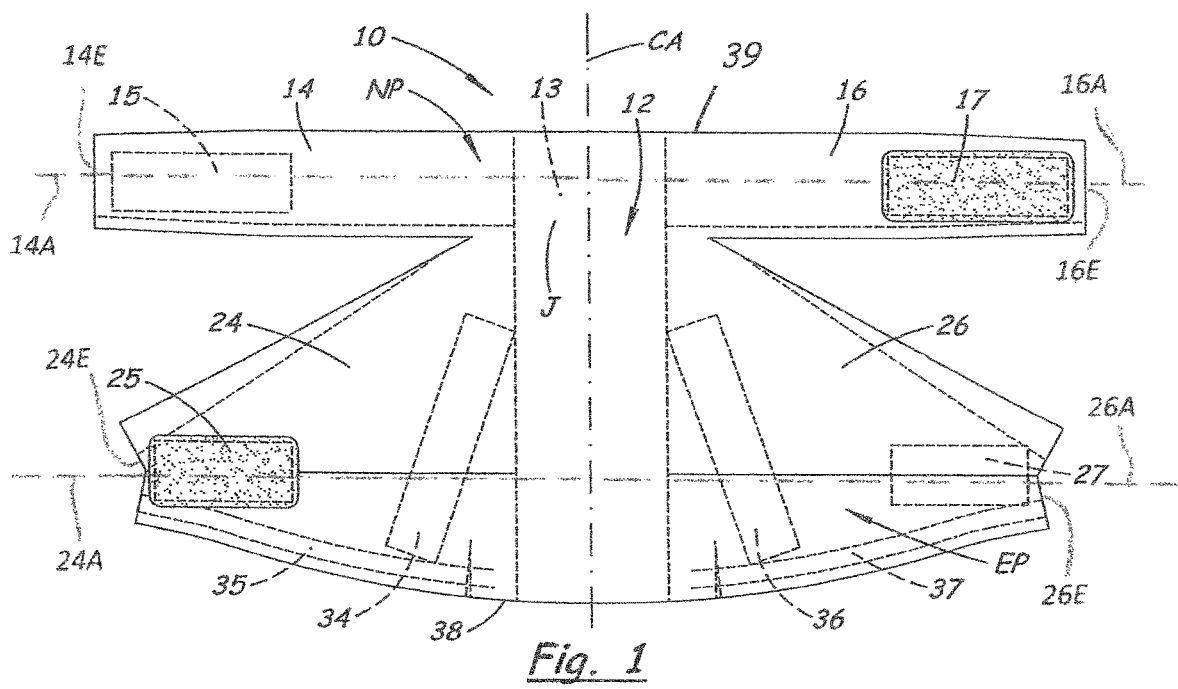
FIG. 1 is a top view of one embodiment of the invented protective device, wherein the device is in its spread-out, generally-flattened configuration.
Figure 2:
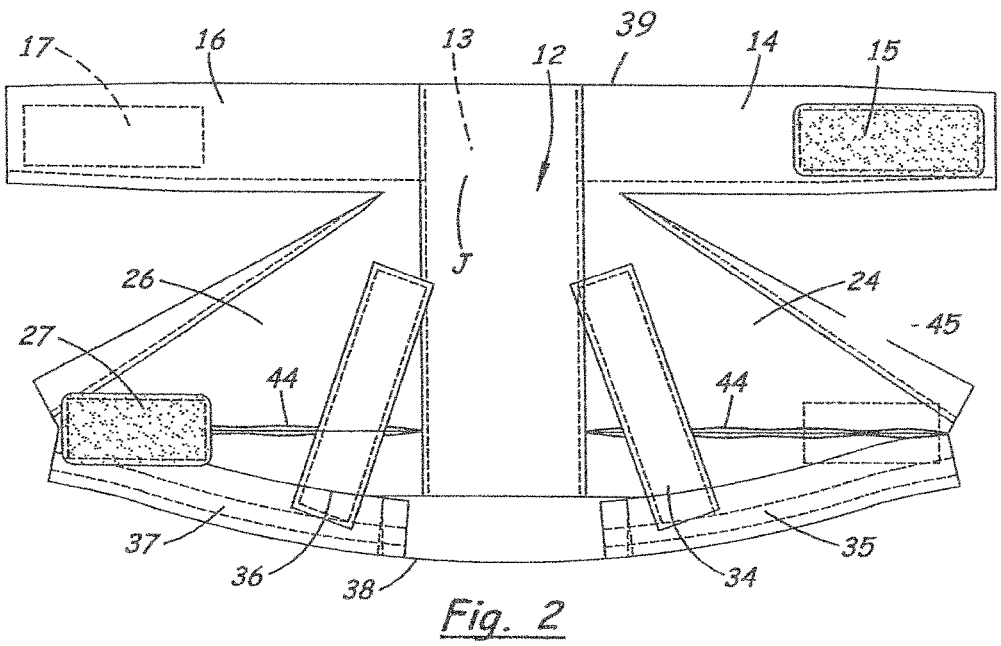
FIG. 2 is a bottom view of the embodiment of FIG. 1.

FIGS. 1 and 2 show top and bottom views, respectively, of one embodiment of the device 10. FIGS. 3 and 4 show a side view and a cross-sectional view of the device 10 in its folded/wrapped and fastened configuration, and FIG. 5 shows a side perspective view of the device 10 being worn by a dog. A central panel portion 12 extends between a front edge 38 (at the bottom of the page) and a rear edge 39 (top of page) and comprises longitudinal central axis CA. The central panel portion 12, which during use extends longitudinally along the top of the animals head from nearer the nose to nearer the shoulders, supports or "carries" the portions that extend transversely from it to encircle the animal's neck and to encircle the animal's head, namely, the neck portion NP and the ear portion EP, respectively.

The neck portion NP (or "collar", or "neck loop", or "rear portion") connects to the ear portion EP (or "hood" or "head loop" or "ear loop" or "front portion"), at junction J, at and adjacent to the central axis CA. The neck portion NP extends rearward from junction J and transversely away from the central axis CA, forming right and left neck straps 14, 16. "Right" and "left" here are used in a way that corresponds to the dog's right and left cheeks, for example, rather than the right and left of the drawing page. Neck straps 14, 16, therefore, are each an elongated, generally rectangular, protrusion from the central panel portion 12 at or near the rear extremity of the device 10. Hook and loop fasteners 15 and 17, or other fasteners, are provided at/near the ends of the right and left neck straps 14, 16 for preferably adjustably fastening the straps 14, 16 around the animal's neck, at or near the smallest diameter portion of the neck, preferably sufficiently tightly that the neck portion stays in place on the neck in spite of the animal's actions such as rubbing against other objects. The preferred adjustable fastener(s) of the neck straps 14, 16, for example hook and loop fastener, provide about 4 inches of adjustment in the circumference of the fastened neck portion; this adjustability allows a single size and style of device to fit the necks of many different dogs, for example. As shown in FIG. 1, each of the right strap 14 and left strap 16 has an inner end at said central axis CA and a strap outer end 14E, 16E, with each of the right and left straps 14, 16 extending out transversely from the central axis CA, so that a right strap axis 14A extends transversely from said central axis CA to the right strap outer end 14E and a left strap axis 16A extends transversely from said central axis CA to the left strap outer end 16E, and the right strap axis 14A and left strap axis 16A are each perpendicular to the central axis CA.

The ear portion EP extends forward from junction J and transversely away from the central axis CA, forming right and left wings 24, 26. Right and left wings 24, 26 may be generally triangular protrusions, each comprising a triangle-point/end distanced from the central axis CA that is the outermost extremity of each wing 24, 26. The front edges of each wing 24, 26 preferably align with the front edge of the central panel portion 12 to form a curved front edge 38, which is the front-most extremity of the device 10. Hook and loop fasteners 25 and 27, or other preferably-adjustable fasteners, are provided at/near the ends of the right and left wings 24, 26 for fastening the wings 24, 26 together at connection 28 underneath the animal's head (FIG. 5). Specifically, the wings preferably extend from at or near the largest-diameter of the animal head, which is typically at the occiput, down over each ear and along each cheek, to fasten at the throat/under-the-lower-jaw of the animal. Preferably, the ear portion EP is tightened sufficiently to prevent the animal from pawing the lower half of the ear portion EP forward and up around the animal's snout and to prevent the animal from being able to push/thrust a paw between the device and the animal's skin. The preferred adjustable fastener(s) of the wings 24, 26, for example hook and loop fastener, provide about 4 inches of adjustment in the circumference of the fastened ear portion; this adjustability allows a single size and style of device to fit the head of many different dogs, for example. Each of the right wing 24 and left wing 26 has an inner end at said central axis CA and a wing outer end 24E, 26E, with each of the right and left wings 24, 26 extending out transversely from the central axis CA, so that a right wing axis 24A extends transversely from said central axis CA to the right wing outer end 24E and a left wing axis 26A extends transversely from said central axis CA to the left wing outer end 26E, and the right wing axis 24A and left wing axis 26A are each perpendicular to the central axis CA.

Several features prevent the ear portion EP from being pawed forward or rearward off the head. For example, the secure placement of the neck portion NP around the neck, combined with the connection of the two portions NP and EP at the top of the head, helps prevent pushing or "scrunching" of the device forward off the head. The preferred stiffening/rigidizing adaptations, along the top of the device (preferably in the central panel portion 12), the front edge of the device, and optionally other portions of the sides, helps prevent rolling-up or rearward "scrunching" of the device rearward off the ears and head. Thus, dislodging the ear portion EP from its desired location is unlikely.

Thus, the neck portion NP and the ear portion EP, in use, are fastened into two loops or sleeves and are placed on the animal in different, preferably entirely or substantially non-overlapping, non-layered positions. For example, as illustrated in FIG. 5, the neck portion NP is rearward of the ear portion EP, with a gap G between the lower regions of the portions NP, EP where one may typically see a portion of the animal's neck N. The rearward, neck portion is snug and relatively tight around the neck of the animal, that is, sufficiently snug/tight to maintain the device in position relative to the neck and to prevent the animal from pulling or pushing off the device in a forward direction. Because the neck portion is around a smaller or the smallest diameter of the neck, forward from the relatively larger shoulders and rearward from the relatively larger head/occiput region, the neck portion is not typically removable by the animal. The forward, ear portion EP may be installed with varying tightness around the occiput-ear-cheek region, for example, as tight as the animal owner or caregiver feels is necessary to limit or prevent the ears from "flapping". The ear portion may be looser than the neck portion in certain embodiments or tighter than the neck portion in certain embodiments. In certain embodiments, as illustrated by FIGS. 3, 5, 10, 14, 19 and 22, the head loop diameter (DH in FIGS. 3 and 4) may be the same, or substantially the same, as the neck loop diameter (DN in FIG. 3).

Stiffener/rigidizing adaptations, such as plate or strip members, may be used: 1) to control the shape and position of the ear portion EP and hence the contact/pressure of the ear portion EP on the ears or on certain portions of the animal's skin, and/or 2) to prevent rolling-up or scrunching of the ear portion by pawing the ear portion or by rolling/rubbing against the ground or another object. The stiffener/rigidizing adaptations, such as the plate or strip members, are preferably: 1) more rigid than the surrounding material/portions of the device, for example somewhat rigid and somewhat inflexible, 2) but not so rigid and inflexible as to be harmful or hurtful to the animal, while 3) being slightly bendable and resilient. For example, said plate or strip members may each be a sheet of high density polyethylene that lies substantially on a sheet plane (being only a few millimeters thick for example and much longer and wider than thick). Each plate or strip member "sheet" may temporarily be forced to bend out of its sheet plane but will resiliently return to lying in said sheet plane (to be planar or substantially planar) when the force is lessened or removed. Thus, the resilient stiffener/rigidizing members/regions tend to return to their original shape and position when the animal attempts to paw, push, or rub the device off its head/ears. This resiliency limits or prevents the animal's pawing or other actions from being able to scrunch or otherwise dislodge the device from its preferred location described in this document and shown in the figures. The animal may paw or push the device a few times, but the stiffener/rigidizing member/regions resiliently "spring" back to the desired position as soon as the animals paw or force is relaxed or withdrawn; soon, most animals get used to the device and stop trying to remove it. The resilient stiffener/rigidizing members/regions may comprise integral stiffened regions of relatively-stiff material that is attached to adjacent more-flexible (less-stiff) material by sewing, adhesive, or other attachment/connection means, and/or separate plates/strips of relatively-stiff material that are inserted into or between layers of the surrounding more-flexible (less-stiff) material.

Preferred stiffener/rigidizing members comprise one or more plates 13 may be sewn or otherwise provided in/on the central panel portion 12, in order to make the central panel portion 12 a generally planar, non-rollable and non-scrunchable region at the top of the animal's head. Further, in certain embodiments, additional strips 34, 36 are sewn or otherwise provided in the wings 24, 26, which strips 34, 36 may be more rigid than the surrounding material of the device, to shape the region for optimum protection/retention of the ears and/or to further prevent said rolling-up or scrunching. The strips 34, 36 preferably each extend from a rearward location at or near the plate 13 and extend forward and slightly downward, toward the front edge of the wings. This rear anchoring/positioning and generally horizontal, or "forward and downward" slanting of the strips, will tend to cross over the ears and rigidize the ear portion for roll-up/scrunch prevention. Additional strips 35, 37 are preferably used at or near the front edge of each wing, to further form/control the shape of the ear portion and to resiliently resist the animal's actions and rubbing against other objects from dislodging the ear portion. The plate 13, strips 34, 36, and/or strips 35, 37 adapt certain embodiments of ear portion to feel and act like a hood rather than a tight compression sock or band.

The plate 13, strips 34, 36, and/or strips 35, 37, may be connected to outer surfaces, or placed inside pockets or other spaces between layers, of fabric that are used in construction of the device 10 according to conventional sewing techniques, for example. Connecting the plate 13, strips 34, 36, and/or strips 35, 37 to the inside surface of the device, and/or in a way that exposes them at the inner surface of the device to the animal's skin, is less desirable because the exposed plate(s) or strip(s) might tend to rub or poke the animal.

To further shape and fit the device 10 to the animal's head, fabric layer(s) may be folded over at edges and/or seams, and tucks 44 or gussets may be provided. The tucks 44 are desired to create a slight cup-shaped curvature in each side wing 24, 26, for cupping/cradling each ear.

Figure 6:
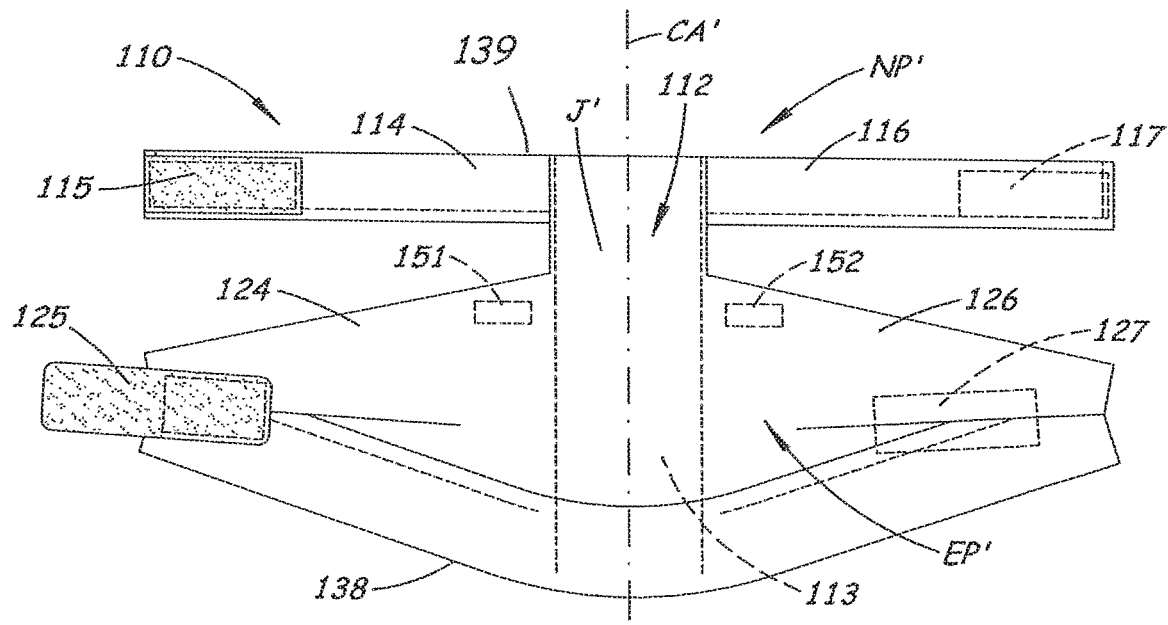
FIG. 6 is a top view of an alternative embodiment of the invented protective device, wherein the device is in its spread-out, generally-flattened configuration.
Figure 7:
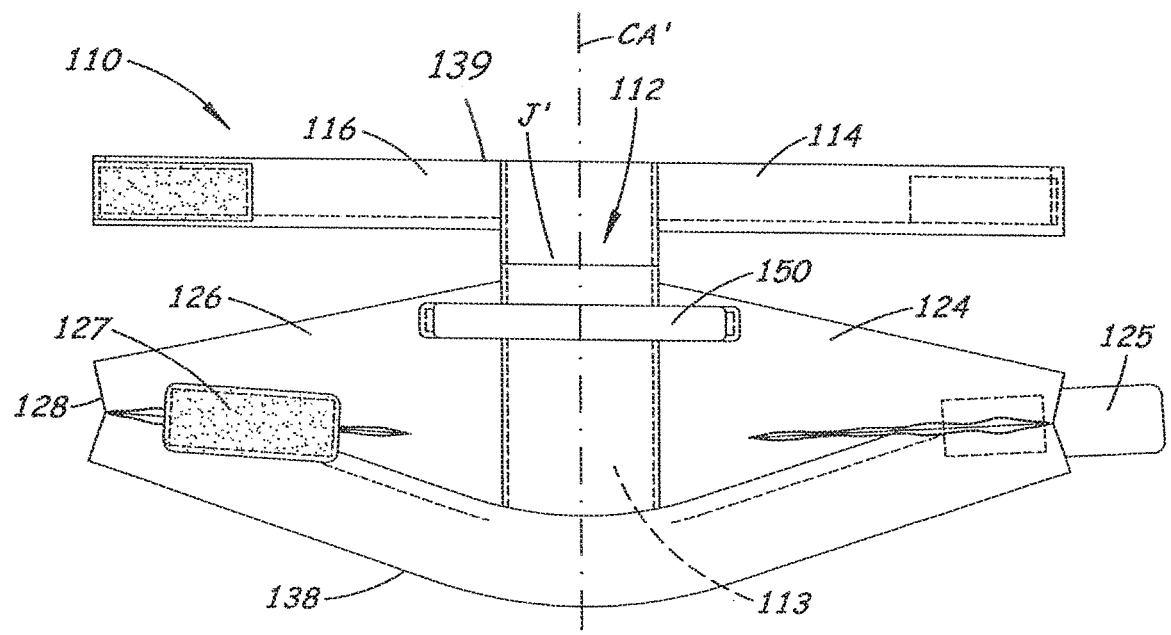
FIG. 7 is a bottom view of the embodiment of FIG. 6.
Figure 8:
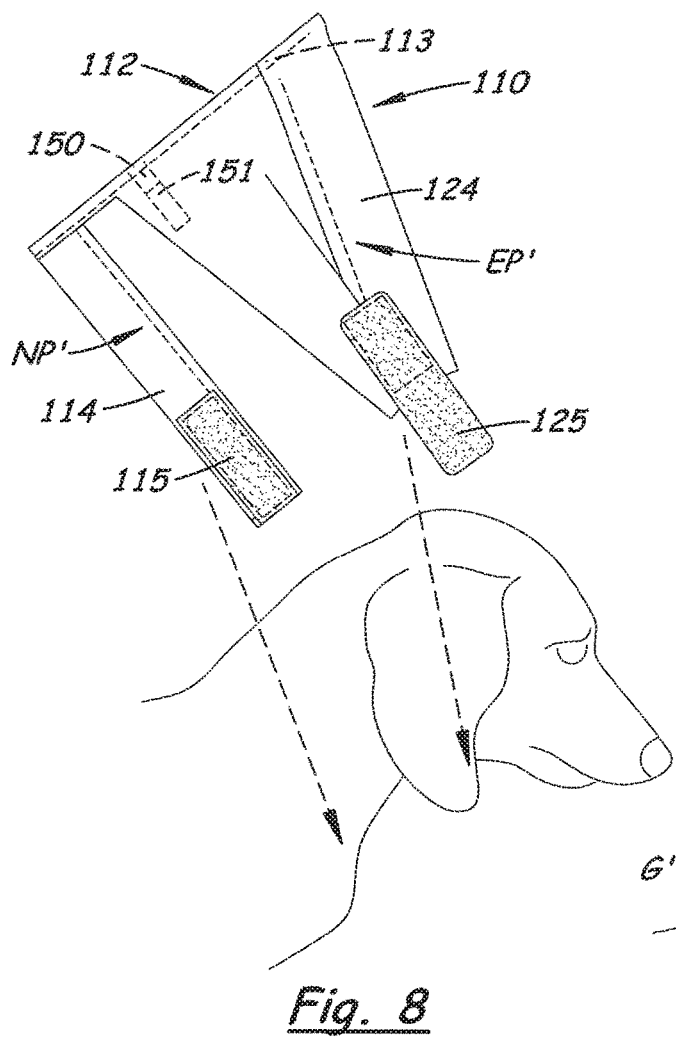
FIG. 8 is a side view showing the embodiment of FIGS. 6 and 7 folded/wrapped, but un-fastened, in preparation for installation of the device on a dog as shown.
Figure 9:
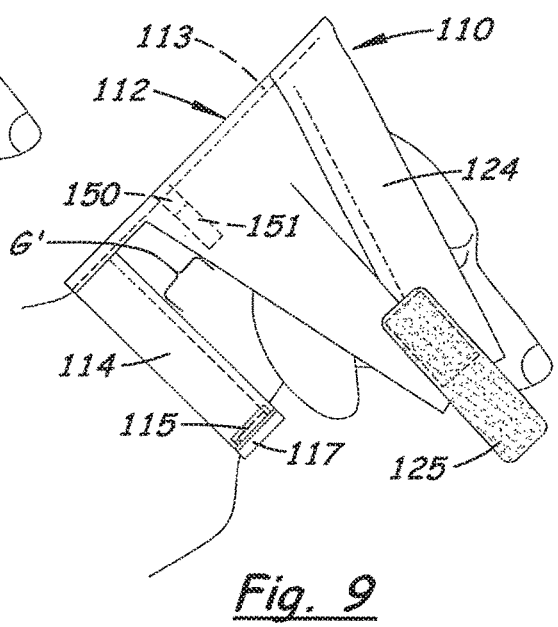
FIG. 9 is a side view of the device of FIGS. 6-8 being installed on the dog, wherein the neck portion has been secured around the dog's neck and the ear portion is about to be fastened at the dog's throat/jaw.
Figure 10:
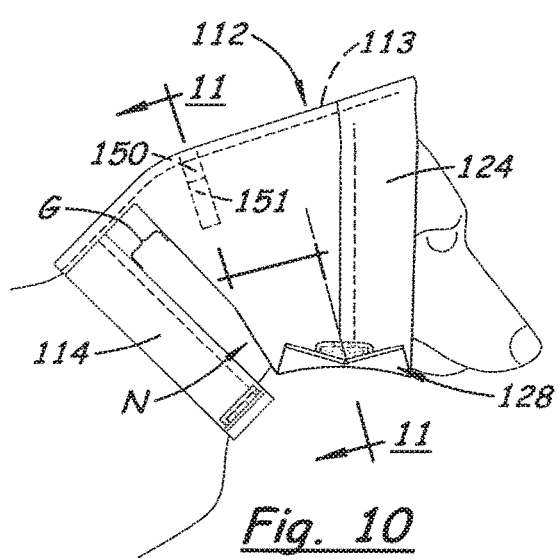
FIG. 10 is a side view of the device of FIGS. 6-9, wherein both the neck and ear portions have been fastened.
Figure 11:
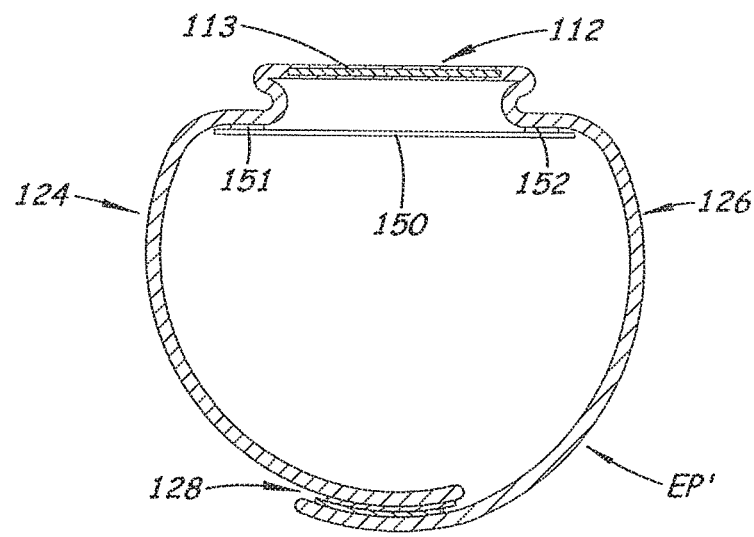
FIG. 11 (which is on a page with FIG. 14) is a cross-sectional front view of the device of FIGS. 6-10, viewed along the line 11-11 in FIG. 10 (without showing the dog's head) where the adjustable strap tightens its region of the ear portion.

FIGS. 6-11 illustrate an alternative embodiment of the device 110, which is made similarly to, and may be used according to the same or generally the same methods as, device 10. FIGS. 6 and 7 show top and bottom views, respectively, of the device 110, and FIG. 8-10 show installation of the device 110 on a dog. Central panel portion 112 extends between a front edge 138 and a rear edge 139 and comprises longitudinal central axis CA'. The neck portion NP, connects to the ear portion EP at junction J', at and adjacent to the central axis CA'. The neck portion NP' extends rearward from junction J' and transversely away from the central axis CA', forming right and left neck straps 114, 116 that are each elongated, generally rectangular, protrusions from the central panel portion 112. Hook and loop fasteners 115 and 117, or other preferably-adjustable fasteners, are provided at/near the ends of the right and left neck straps 114, 116 for fastening the straps 114, 116 around the animal's neck, at or near the smallest diameter portion of the neck.

The ear portion EP' extends forward from junction J' and transversely away from the central axis CA', forming right and left ear wings 124, 126 that are each generally triangular protrusions comprising a triangle point/end distanced from the central axis CA' as the outermost extremity of each wing 124, 126. Hook and loop fasteners 125 and 127, or other preferably-adjustable fasteners, are provided at/near the ends of the right and left wings 124, 126 for fastening the wings 124, 126 underneath the animal's head at connection 128. The ear portion EP wraps around the animal's head, extending across (at or near) the largest-diameter of the animal head, which is typically along the occiput, over each ear and along each cheek, to fasten at the throat/under-the-lower-jaw of the animal.

Similarly to device 10 of FIGS. 1-5, the neck portion NP' and the ear portion EP' of device 110, in use, may be described as fastened into two loops or sleeves and are placed on the animal in different, preferably non-overlapping, non-layered positioned. The rearward, neck portion is snug and relatively tight around the neck of the animal, that is, sufficiently snug/tight to maintain the device in position relative to the neck and to prevent the animal from pulling or pushing off the device. Because the neck portion is around a smaller or the smallest diameter of the neck, forward from the relatively larger shoulders and rearward from the relatively larger head/occiput region, the neck portion is not typically removable by the animal. The forward, ear portion may be installed with varying tightness around the occiput-ear-cheek region, and may be only as tight as the animal owner or caretaker feels is necessary to limit or prevent ear flapping, for example, with a comfortable, mild pressure against the ears. The neck portion is substantially or even entirely used to maintain the device on the animal, with the ear portion's connection/integral-attachment to the neck portion at the top of the animal's head keeping the ear portion in place relative to the neck portion and, hence, the animal's head. The fastening of the ear portion at the animal's throat helps keep the ear portion in place as well, but said connection at the top to the neck portion, and the preferred stiffener/rigidizing elements, prevent an animal from being able to paw the ear portion off, and allows the relatively loose or at least comfortable tightness of the ear portion.

In a similar way and of similar materials as in device 10, stiffener plate 113 may be sewn or otherwise provided in/on the central panel portion 112, making the central panel portion 112 a generally planar, non-rollable, non-scrunchable region at the top of the animal's head during use of the device 110. See FIG. 11, grouped on the same page as FIG. 14. As discussed above, the plate 113 is slightly flexible, to prevent injury to the animal, but is resilient, to return to its original shape and position, in order to limit or prevent the animal's pawing or other actions from being able to scrunch or otherwise dislodge the device from its preferred location.

An adjustment strap 150 is provided transverse to the central axis CA' in device 110, for further fitting of the device 110 to the animal's head. This strap adjustably connects by hook and loop fasteners or other preferably-adjustable fasteners to regions on each side of the central portion 112, and by adjusting the position of the ends of the strap (for example, hook patches) relative to said regions (for example, loop patches), the right and left side wings in those areas are pulled together. Said pulling together of said regions serves to adjust the width of the ear portion, or, in other words, effectively reduce the distance between the "triangle-point/end" outermost extremities of each wing 24, 26 and, hence, reduce the effective circumference of the ear portion "loop". For example, there may be enough variability of placement of the strap 150 on the patches 151, 152, to pull the patches together by up to 1-2 inches preferably, or even up to about 3 inches, for example. This will make the ear portion fit the animal head substantially better in that area, for example, keeping the ears from sliding or falling rearward toward or out from the rear of the ear portion.

Thus, the preferred device comprises an ear portion that tends to feel and act like a hood rather than a tight sock, band, or wrap. This may be accomplished by a combination of selected fabrics, the shape and contour of the ear portion as formed/sewn and stiffened in selected regions, and/or adjustments in the dimensions of the ear portion when fitted on the animal. In addition to (or instead of in certain embodiments) the plates, strips, and straps discussed above, other plates, strips, or straps, or other shape-forming structure may be used to form/control the shape and resiliency of the ear portion. In certain embodiments, instead of inserting/attaching said stiffener plates and strips into/on flexible and foldable fabric, the device may be made of multiple panels of different materials that have different rigidities and resiliencies. Conventional sewing techniques, for example, may be used to construct the device with stiffeners inserted or attached to flexible fabric, and/or from multiple panels and multiple materials.

FIGS. 8-10 illustrate how the device 110 may be placed on a dog. As with device 10, device 110 is adapted to limit or prevent the ears from flapping, or to limit or prevent foreign objects from reaching ears or other portions of the head of the animal. One may see how the forward portion, the ear portion EP', is forward relative to (and essentially separate from except for the connection at junction J') the neck portion NP'. A gap G typically exists between the ear portion EP' and the neck portion NP', so that a portion of the animal's neck N typically may be visible between the two portions EP', NP'. The fastener(s) for the ear portion are forward and spaced from the fastener(s) for the neck portion. The two portions EP' and NP' typically and preferably do not lie on top of one another or otherwise overlap, or at least preferably do not overlap more than a small amount near the neck of the animal.

Thus, in both device 10 and device 110, one may say that a portion of a single panel encircles the animal's neck and another portion of the single panel encircles the animal's head, the single panel (and each of said portions) preferably not comprising any ear holes or any eye holes. Preferably, none of the device 10, 110 extends under an earflap (pinna) of the animal, that is, between the earflap (pinna) and the side/cheek of the animal. The ears of the animal are preferably and typically not inserted through any hole/slit/hole and need not be touched or handled by the person installing the device 10, 110 on the animal. There is preferably and typically no frame structure or guide structure that lifts the animal's ears, and, hence, the device 10, 110 would typically not be used for supporting or controlling cropped dog ears.

Figure 12:
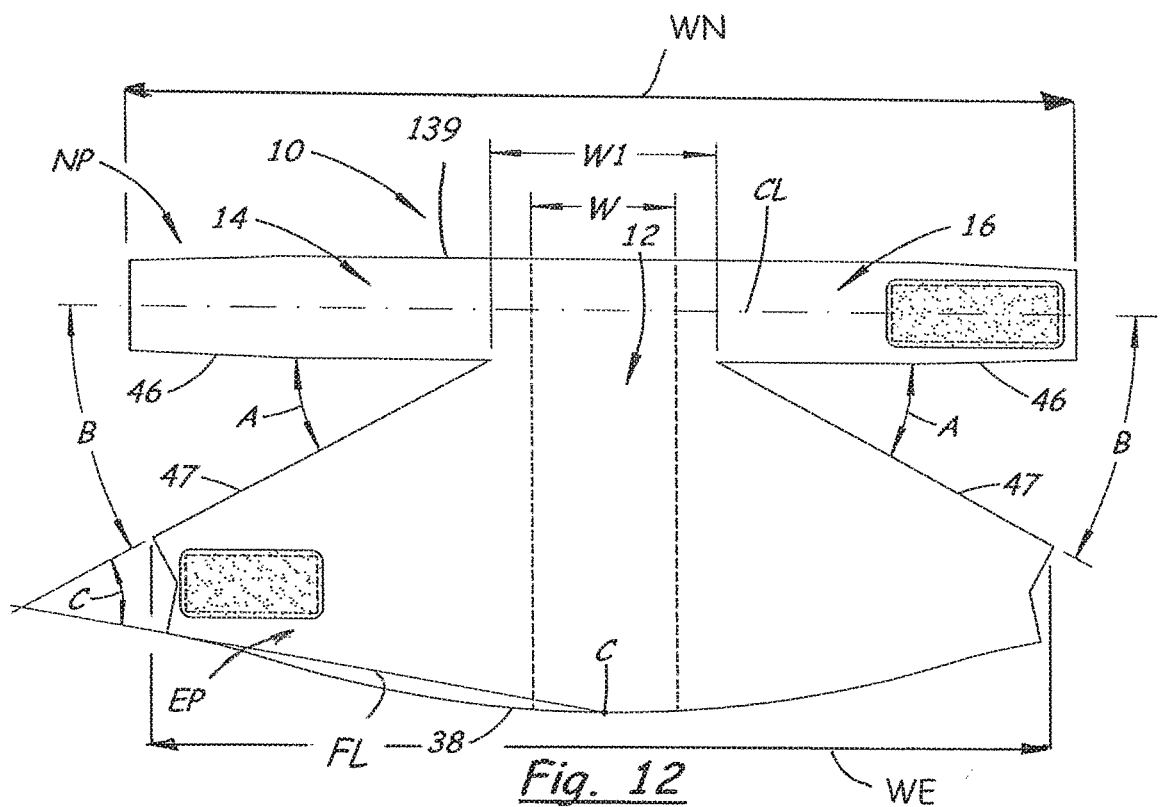
FIG. 12 is a top view of the embodiment of FIGS. 1-5, showing less detail than in FIGS. 1-5 but illustrating certain angles and relationships of the portions of the device.
Figure 13:
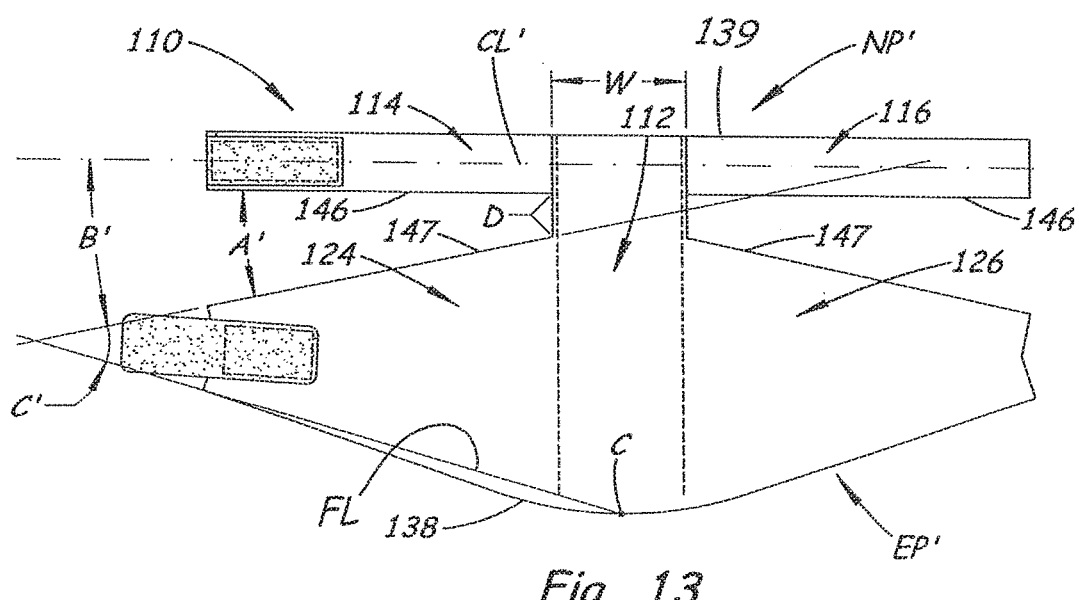
FIG. 13 is a top view of the embodiment of FIGS. 6-10, showing less detail than in FIGS. 6-10 but illustrating certain angles and relationships of the portions of the device.

FIGS. 12 and 13 illustrate certain features, of the main panels of devices 10, 110, respectively, which provide a good fit and effective performance in terms of retaining the device 10, 110 on the animal and limiting or preventing potentially-damaging ear-flapping and/or potentially-damaging plant, arachnid, or insect access. The neck portion NP, NP' straps 14, 16, 114, 116 extend straight and transversely from the central portion, with straight front edges 46, 146 being generally perpendicular to the length of the central portion 12, 112 and generally parallel to the longitudinal centerline CL, CL' of the straps 14, 16, 114, 116. Ear portions EP, EP' have rear edges 47, 147 that extend out and forward from the central portion, so that angles A, A' between the front edges of the neck portion NP, NP' and the rear edges of the ear portion EP, EP' are in the range of about 15-60 degrees, and more preferably in the range of 15-45 degrees, and most preferably in the range of 20-35 degrees. As the front edges 46, 146, are generally parallel to the centerline CL, CL' of the straps, angle B, B' is the same or about the same as angle A, A', and, hence, about 15-60 degrees, and more preferably in the range of 15-45 degrees, and most preferably in the range of 20-35 degrees. Angle C, C' between the rear edges 47, 147 of the ear portions EP, EP' and the front edges 38, 38' (being approximated by a line FL from the end of the ear portions to the center C of the central portion) is about 25-60 degrees, more preferably 30-55 degrees, and most preferably 40-50 degrees.

It may be noted in FIG. 12 that the width of the narrowest region W1 of the ear portion EP is wider than the width W of the central portion 12. In FIG. 13, the width of the narrowest region of the ear portion EP' is about the same as the width W of central portion 12. It will be apparent from viewing FIGS. 12 and 13, in combination with FIGS. 1, 2, 6, and 7, that the connection junction J, J' that connects the neck portion NP to the ear portion EP has width W1 in FIG. 12 and width W in FIG. 13, and that these widths W1 and W are both much smaller than the width WN and width WE of the neck portion and ear portion, respectively, illustrated in FIG. 12. Preferably, the width W1, W of the junction J, J' is transverse to the central axis and less than 30% (or preferably less than 25%, or most preferably 10-20%) of the width of each of the neck portion and the ear portion. The ear portion EP' in FIG. 13 is connected to the neck portion NP' by a piece of the central portion 112, resulting in their being a strip (distance D) of central portion 112 between the two portions EP' and NP'. In certain embodiments, this distance D may be changed or adjustable to distance the ear portion from the neck portion.

The above relationships and angles are examples of configurations and shapes that result in a neck collar/band that encircles the animals neck, with a substantially separate but centrally-connected protective hood extending across the top of animal head and down along the ears. The separate structure of the neck portion and ear portion allow them to be separately and specially-adapted for their two different purposes. Further, space between the neck portion NP, NP' and the ear portion EP, EP' provides a comfortable fit, without unnecessary and possibly uncomfortable, cumbersome, or interfering fabric or other structure being in said space.

Figure 14:
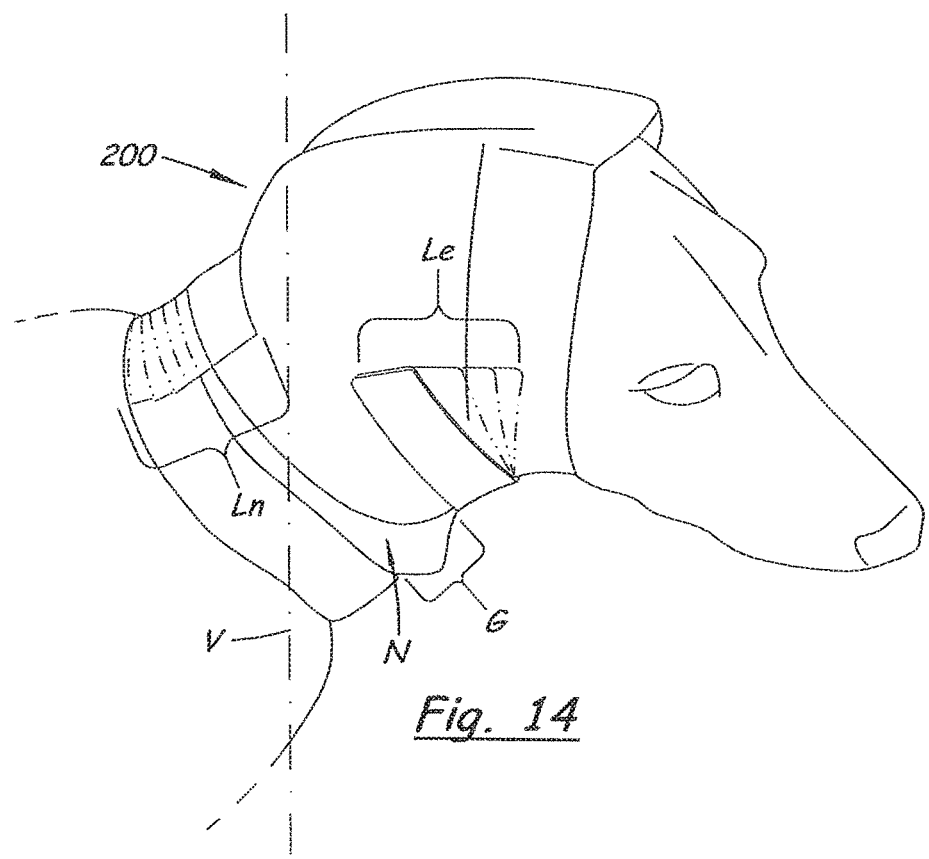
FIG. 14 is a perspective view of yet another embodiment of the invented device on a dog, wherein variability in attachment/fastening locations for the neck straps and ear wings is shown.

FIG. 14 is a portrayal of an alternative embodiment of the device 200, again showing the adaptations wherein the ear portion is substantially separated from the neck portion but is connected to the neck portion at the top of the head/neck. Therefore, a portion of the animal's neck N is again visible in the gap G between the portions. This device 200 is made of fabric, or has fabric areas, that serve as loop fastener to cooperate with hook patches provided on ends of the straps/wings of the device. Therefore, in such an embodiment, an end of the neck portion strap may be fastened in various locations on the outer fabric surface of the neck portion or less preferably on the outer surface of the rear region of the ear portion. This variable fastening location Ln preferably extends a few inches from at or near the rearmost edge of the neck portion to the rearmost region of the ear portion, as shown by dashed lines and an arrow near Ln. Similarly, an end of an ear portion wing may be fastened in various locations on the outer fabric surface of the ear portion. This variable fastening location is shown as Le, and is preferably a few inches along the cheek region of the ear portion, as indicated by dashed lines and an arrow near Le. As may be seen in FIG. 14, it is preferred that locations for ear portion fastening are all forward of the locations for neck portion fastening; that is, the Le locations are all forward from a vertical line/plane V, whereas the Ln locations are all rearward from the vertical line/plane V. Some embodiments with this amount of variability in fastening location are less preferable compared to those with specifically-placed hook and loop patches, as they may allow for leeway in installation that may not result in optimum performance.

Figure 15:
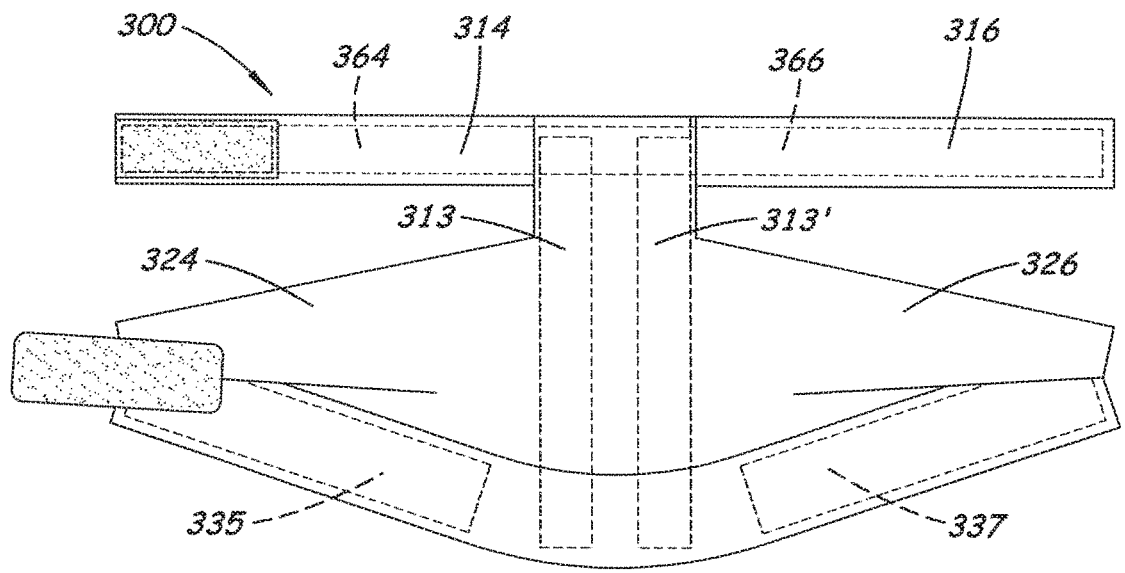
FIG. 15 is a top view of yet another embodiment of the invented protective device, wherein the device is in its spread-out, generally-flattened configuration.
Figure 16:
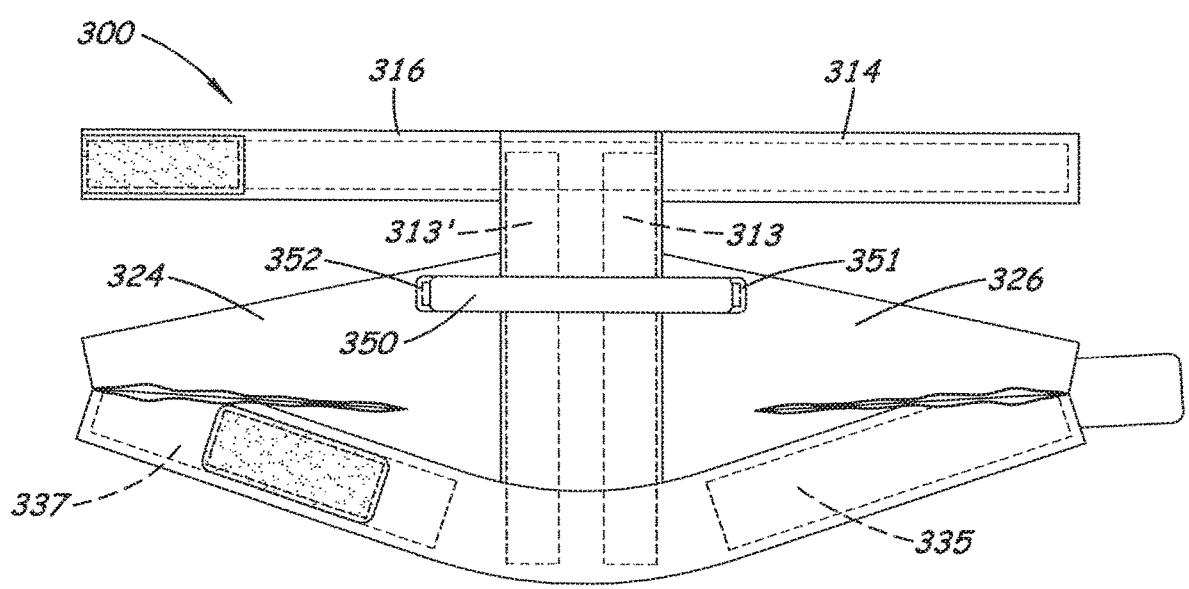
FIG. 16 is a bottom view of the embodiment of FIG. 15.

FIGS. 15 and 16 are top and bottom views, respectively, of yet another alternative device 300. One may understand from viewing these figures that this embodiment 300 has much structure, and many features and uses, in common with the earlier-described embodiments. For example, the central panel portion extends between a front edge (at the bottom of the page) and a rear edge (top of page) and comprises a longitudinal central axis. The neck portion connects to the ear portion, at a junction, at and adjacent to the central axis extending from the front edge to the rear edge of the device 300. The neck portion extends rearward from the junction and transversely away from the central axis, forming right and left neck straps 314, 316. Neck straps 314, 316, therefore, are each an elongated, generally rectangular, protrusion from the central panel portion at or near the rear extremity of the device 300. Hook and loop fasteners, or other preferably-adjustable fasteners, are provided at/near the ends of the right and left neck straps for fastening the straps around the animal's neck, at or near the smallest diameter portion of the neck. Hook and loop fasteners, or other preferably-adjustable fasteners, are provided at/near the ends of the right and left wings 324, 326 of the ear portion, for fastening the wings around the animal's ears and cheeks, by fastening at the throat/jaw area.

Device 300, like certain other embodiments, is mainly formed of flexible fabric plus adjustable fasteners, and stiffener/rigidizing members. Similarly to the embodiments above, the stiffener/rigidizing members are plates or strips that are much longer and wider than thick, and that are resilient but more rigid than the surrounding materials, for controlling the ear portion shape and pressure on the animal's ears and/or to prevent rolling-up or scrunching of the ear portion, as discussed above. The plates 313, 313' may be made of/from a sheet(s) of polymer such as high density polyethylene, for example. Particularly preferred in this embodiment are two parallel plates 313, 313' (which, due to their dimensions, could also be called "strips") that may be sewn or otherwise provided in/on the central panel portion of the device 300. Plates 313, 313' are more rigid than the surrounding material of the device, in order to make the central panel portion generally non-rollable and non-scrunchable, especially front the front to the back of the device, as discussed earlier in this document. These two plates 313, 313' are spaced apart slightly and are on each side of the central axis, that is, not lying on or crossing over the central axis, and have been found in certain embodiments to be more effective than a single plate that lies on and crosses over the central axis. These two plates 313, 313' may pivot in position relative to each other because they are not connected except by virtue of being on or in flexible fabric. The plates tend to lie along-side, but not over, the dog's sagittal crest that runs longitudinally along the top of the dog's head. Lying thus on each side of a the crest/ridge of the dog's head, and in certain embodiments pivoting to be at an obtuse angle to each other rather than co-planar, the two plates 313, 313' tend to stay in place relative to the dog's head and to be comfortable, while still accomplishing the desired utility of preventing rolling and scrunching of the device by the dog.

Additional relatively-rigid but resilient stiffener/rigidizing strips/plates 335, 337 may be sewn or otherwise provided in the wings. The strips/plates 335, 337 may be at or near the front edge of the ear portion, to further form/control the shape of the ear portion. Additionally, stiffener/rigidizing strips/plates 364 and 366 may be provided in/on the neck straps 314, 316 for reinforcement and improved reliability and comfort when the neck straps are fastened around the dog's neck to hold the device 300 in place relative to the dog's head.

An adjustment strap 350 is provided in device 300, transverse to the central axis and to the plates 313, 313', for further fitting of the device 300 to the animal's head, similarly as described above regarding adjustment strap 150. Strap 350 adjustably connects to ear portion (for example, hook patches), on each side of the central portion, and by adjusting the position of the strap (for example, loop patches or loop material all along the length of the strap) relative to said regions, the right and left side wings in those areas are pulled together to shorten the width of the ear portion, and, as discussed above, to shorten the distance between the ends of the wings and the resulting circumference of the ear portion "loop". For example, there may be enough variability of placement of the strap 350 on the patches 351, 352, to pull the patches together by up to 1-2 inches, or even more, for example, up to 3 inches or 4 inches. In device 300, the strap 350 and the patches 351, 352 are on the bottom/inside of the device 300 and so strap 350 is adjustable by a user from the inside of the device, typically prior to installing the device 300 on the animal.

Figure 17:
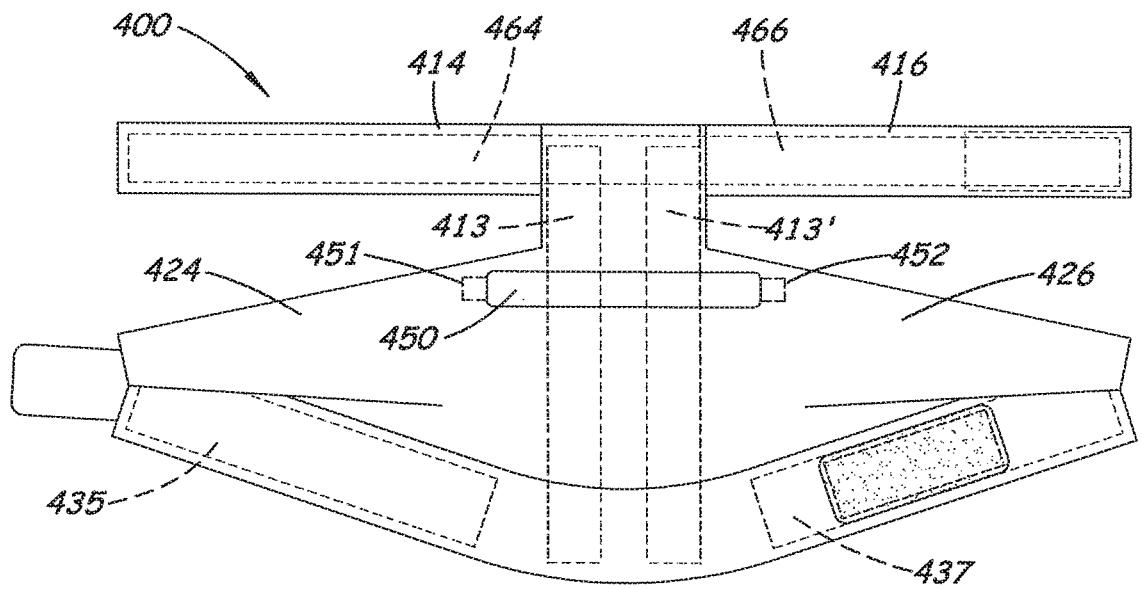
FIG. 17 is a top view of yet another embodiment of the invented protective device, wherein the device is in its spread-out, generally-flattened configuration.
Figure 18:
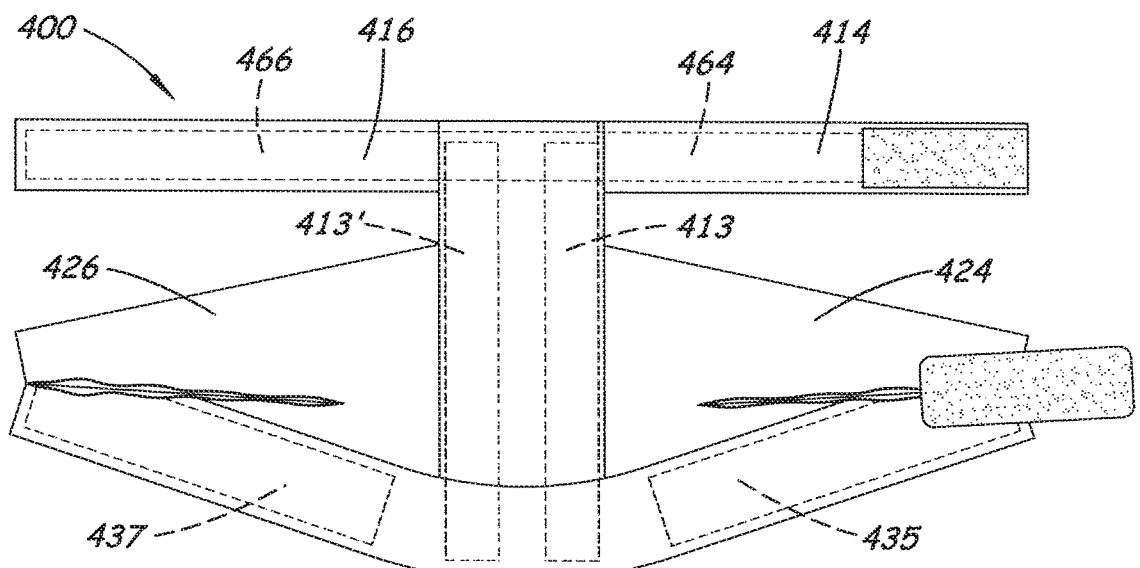
FIG. 18 is a bottom view of the embodiment of FIG. 17.

FIGS. 17 and 18 are top and bottom views, respectively, of yet another alternative device 400. One may understand from viewing these figures that this embodiment 400 has much structure, and many features and uses, in common with the earlier-described embodiments. For example, a central panel portion extends between a front edge (at the bottom of the page) and a rear edge (top of page) and comprises a longitudinal central axis. The neck portion connects to the ear portion at a junction, at and adjacent to the central axis. The neck portion extends rearward from junction and transversely away from the central axis, forming right and left neck straps 414, 416. Neck straps 414, 416, therefore, are each an elongated, generally rectangular, protrusion from the central panel portion at or near the rear extremity of the device 400. Hook and loop fasteners, or other preferably-adjustable fasteners, are provided at/near the ends of the right and left neck straps for fastening the straps around the animal's neck, at or near the smallest diameter portion of the neck. Hook and loop fasteners, or other preferably-adjustable fasteners, are provided at/near the ends of the right and left wings 424, 426 of the ear portion, for fastening the wings around the animal's ears and cheeks, by fastening at the throat/jaw area.

Device 400, like certain other embodiments, is mainly formed of flexible fabric plus adjustable fasteners, and relatively rigid but resilient stiffener/rigidizing members, for example made from polymer such as high density polyethylene. Particularly preferred in this embodiment are two parallel plates 413, 413' that may be sewn or otherwise provided in/on the central panel portion of the device 400. Plates 413, 413' are more rigid than the surrounding material of the device, in order to make the central panel portion generally non-rollable and non-scrunchable, especially front the front to the back of the device, as discussed earlier in this document. These two plates 413, 413' are spaced apart slightly and are on each side of the central axis, that is, not lying on or crossing over the central axis, and have been found in certain embodiments to be more effective than a single plate that lies on and crosses over the central axis. These two plates 413, 413' may pivot in position relative to each other because they are not connected except by virtue of being on or in flexible fabric. The plates tend to lie along-side, but not over, the dog's sagittal crest that runs longitudinally along the top of the dog's head. Lying thus on each side of a the crest/ridge of the dog's head, and in certain embodiments pivoting to be at an obtuse angle to each other rather than co-planar, the two plates 413, 413' tend to stay in place relative to the dog's head and to be comfortable, while still accomplishing the desired utility of preventing rolling and scrunching of the device by the dog.

Additional stiffener/rigidizing strips/plates 435, 437 may be sewn or otherwise provided in the wings, at or near the front edge of the ear portion, to further form/control the shape of the ear portion. Additionally, stiffener/rigidizing strips/plates 464 and 466 may be provided in/on the neck straps 414, 416 for reinforcement and improved reliability and comfort when the neck straps are fastened around the dog's neck to hold the device 400 in place relative to the dog's head.

An adjustment strap 450 is provided in device 400, transverse to the central axis and to the plates 413, 413', for further fitting of the device 400 to the animal's head. Like straps 150 and 350 discussed above, strap 450 adjustably connects to regions of the ear portion, on each side of the central portion, wherein adjusting the position of the strap relative to said regions can pull the right and left side wings in those areas together, for reducing the width of the ear portion, in other words, reducing the distance between the outer extremity ends of the wings and the resulting circumference of the ear portion "loop". For example, there may be enough variability of placement of the strap 450 on the patches 451, 452, to pull the patches together by up to 1-2 inches, or even more, for example, up to 3 inches or 4 inches. As with strap 150 and 350, this will make the ear portion fit the animal head substantially better in that area, for example, keeping the ears from sliding or falling rearward toward or out from the rear of the ear portion. In device 400, one may note that the strap 450, and patches 451, 452, are on the top/outside of the device 400 and so is adjustable by a user from the outside of the device, for example, after the device 400 has been placed on the animal's head.

Figure 19:
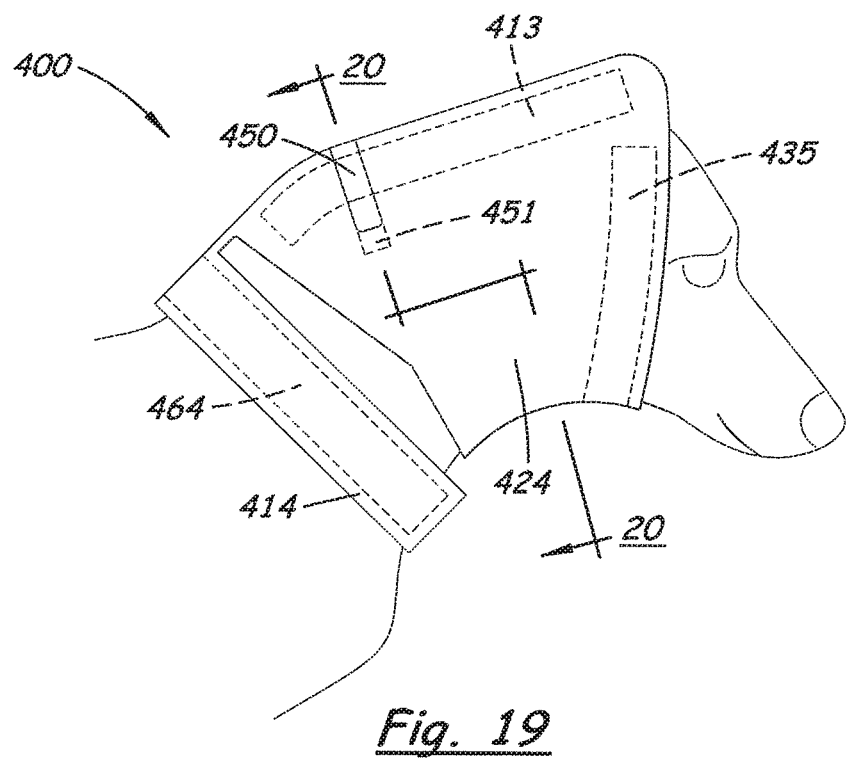
FIG. 19 is a side view of the embodiment of FIGS. 17 and 18 installed on a dog.
Figure 20:
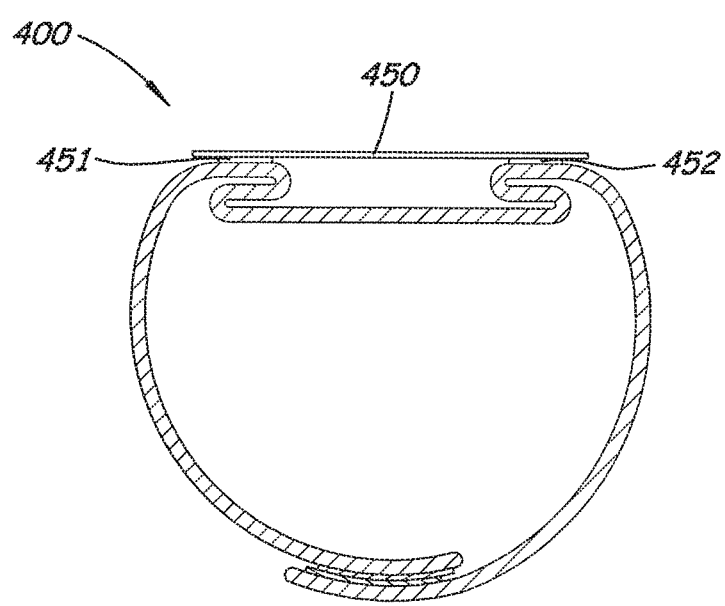
FIG. 20 is a cross-sectional view of the device of FIGS. 17-19, viewed along the line 20-20 in FIG. 19 (without showing the dog's head), wherein the adjustable strap on the top/outside of the device is shown tightening its region of the ear portion.

Device 400 may be seen installed on a dog in FIG. 19, with a schematic cross-section of the device 400 shown in FIG. 20 as would be viewed along 20-20 in FIG. 19. From these figures and from the discussion earlier in this document, one may understand how the device 400 is installed on the dog, and how the strap-based (450, 451, 452) adjustment system will work to provide a good fit for various dogs and/or various medical or foreign-object-prevention needs.

Figure 21:
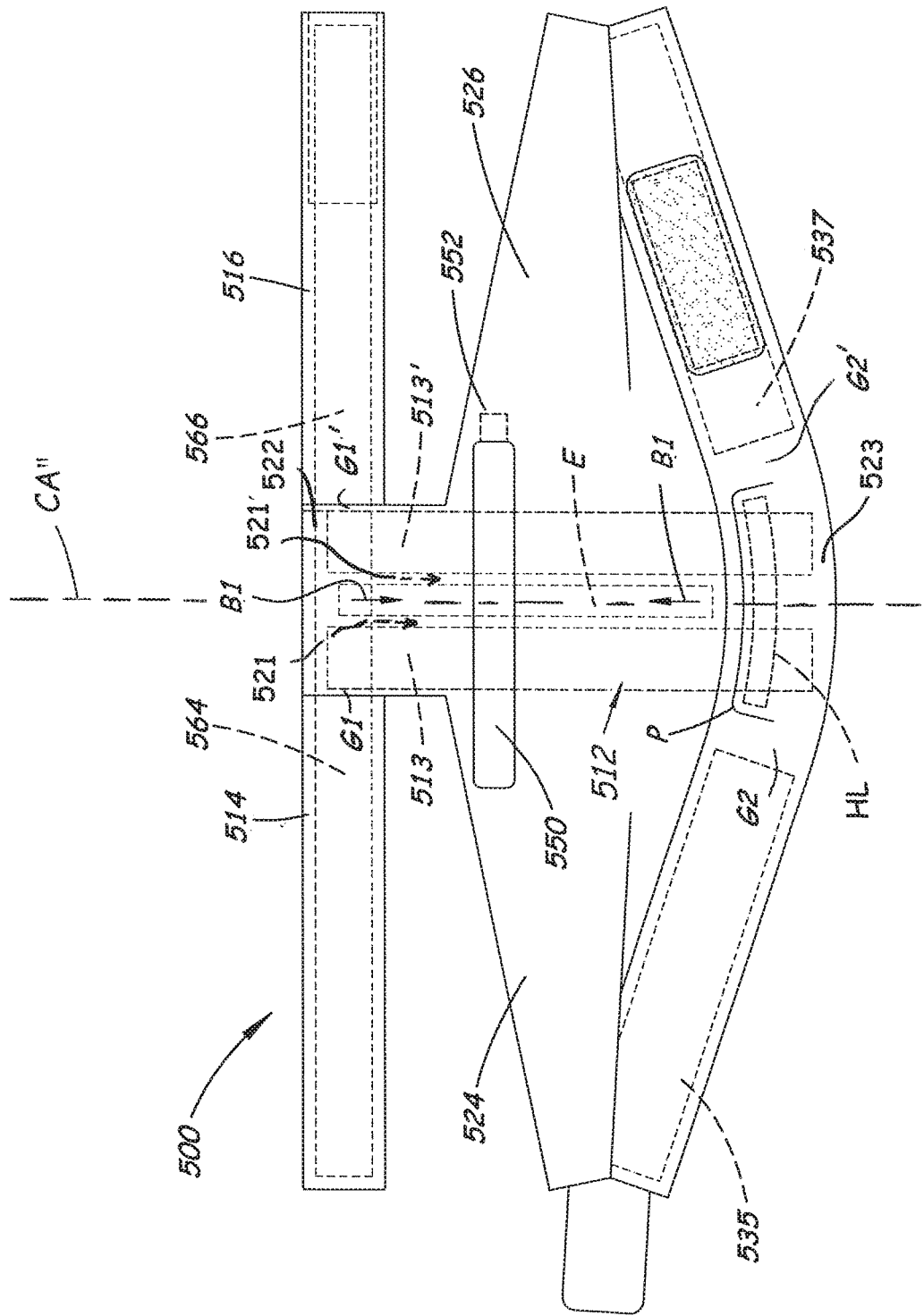
FIG. 21 is a top view of yet another embodiment of the invented protective device, including a length adjustment system and a width adjustment system, wherein the device is in its spread-out, generally-flattened configuration.

An especially-preferred embodiment of the device 500 is shown in FIGS. 21 and 22. One may understand from viewing these figures that this embodiment 500 has much structure, and many features and uses, in common with the earlier-described embodiments, but has further refinements in adjustability. Similarly to devices 10, 110, 200, 300, and 400, device 500 has a neck portion and ear portion that, in use, may be described as fastened into two loops or sleeves for placement on the animal preferably in different, preferably non-overlapping, non-layered positions on the neck and the head/ears, respectively. The rearward, neck portion comprises neck straps 514, 516 fastenable to be snug and relatively tight around the neck of the animal, that is, sufficiently snug/tight to maintain the device in position relative to the neck and to prevent the animal from pulling or pushing off the device, as in earlier-described embodiments. The forward, ear portion may be installed with varying tightness around the occiput-ear-cheek region. The ear portion may be fastened/adjusted to be only as tight as the animal owner or caretaker feels is necessary, with a comfortable, mild pressure against the ears for example, to limit or prevent ear flapping and/or to guard against foreign objects from reaching ears or other portions of the head of the animal. The fastening of the ear portion around the animal's head helps keep the ear portion in place as well, but the connection of the ear portion at the top to the neck portion, and the preferably-resilient stiffener/rigidizing members/regions, prevent an animal from being able to paw the ear portion off, and allows the relatively loose or at least comfortable tightness of the ear portion. Stiffener/rigidizing members/regions preferably extend along all or nearly all of the length of the device from the front edge to the rear edge of the device, for example, greater than 70% of said length, greater than 80% of said length, or greater than 90% of said length. Also, stiffener/rigidizing members/regions preferably extend along all or nearly all of the front edge of the device (along the "length" dimension between the wing ends, that is, the end extremities of the wings), for example, greater than 60% of said length of the front edge, greater than 70% of said length of the front edge, or greater than 80% of said length of the front edge.

As in other embodiments described above, the ear portion extends forward from a junction area, at or near the central longitudinal axis CA" of the device 500, serving as a connection between the substantially separate ear and neck portions. The central panel portion 512 of the ear portion may be said to comprise said junction, and to carry the neck straps 514, 516 at a rear end of the portion 512, and also the ear portion right and left wings 524, 526, that extend generally transverse to the central panel portion 512 and the central axis of the device. As in the other embodiments described above, wings 524, 526 are fastened together for installation on the animal, so that the ear portion is wrapped and comfortably tightened around the animal's head, preferably extending from at or near the largest-diameter of the animal head (typically at the occiput), down over each ear and along each cheek, and around the throat/under-the-lower-jaw of the animal.

Adjustable strap 550 is supplied on the outside of the ear portion, in a similar manner as strap 450, but with one end (toward the left in FIG. 21) of the strap 550 being permanently attached to the ear portion and with the other end (toward the right in FIG. 21) being detachable and adjustable relative to the ear portion at hook/loop fastener 552. This single-end adjustment has the same or similar effect as the two-end adjustment straps discussed above, to pull regions of the ear portion together for adjusting width of the ear portion for a better fit, in other words, adjusting the distance between the outer extremity ends of the wings and adjusting the resulting circumference of the ear portion "loop".

As discussed above, stiffener/rigidizing members/regions may be important for control of the shape and position of the ear portion EP and hence the contact/pressure of the ear portion EP on the ears or on certain portions of the animal's skin, and/or to prevent rolling-up or scrunching of the ear portion by pawing the ear portion or by rolling/rubbing against the ground or another object. Removable and resilient stiffener plates 513, 513' are provided in the central panel portion 512, and, as explained below, the removability is important in a longitudinal adjustment system provided for the device 500. As discussed earlier in this document, such resilient stiffener plates are more rigid than the surrounding material of the device, for example a polymer such as high density polyethylene, but are slightly bendable to avoid injury to the animal. Further, additional strips 535, 537 of similar or the same material as plates 513, 513' may be sewn or otherwise provided in the wings 524, 526 to shape the region for optimum protection/retention of the ears and/or to further prevent said rolling-up or scrunching. Strips 564, 566 may be made of similar or the same material as plates 513, 513' and strips 535, 537, for placement in the neck portion to reinforce and/or stiffen the neck straps 514, 516, for example.

In addition to the adjustable fasteners and resilient stiffener features, the central panel portion 512 of device 500 additionally features a longitudinal adjustment system for customizing the length of the device 500, along central axis CA", for different animals. The central panel portion 512 is provided with a bias B1 for shortening the length of portion 512 along longitudinal central axis CA", thus, shortening the entire device. In effect, this brings the ear portion closer to the neck portion, and the front edge of the device closer to the rear edge of the device. The preferred, but not the only possible, bias is provided by elastic E in/on the central panel portion 512, oriented and elastically-biased in such a way that the elastic tends to pull the front end and rear end of the central panel portion 512 towards each other, as shown by the arrows of bias B1. A seamstress or other person of skill in the art will understand how to provide the bias B1 by installing one or more pieces of elastic or spring material, for example, centrally located in portion 512.

Two plates 513, 513' are inserted into one or more pockets in portion 512, with one or more openings into the pocket(s). Preferably, a single pocket opening P is provided at an end of what amounts to a two-compartment pocket in the panel. The two compartments 521, 521' are separated along most of their lengths by the elastic E and/or stitching or other structure, but the interiors of both compartments 521,521' are preferably accessible through a single opening P. Upon opening of the pocket opening P, preferably by means of an optional latch such as a hook-and-loop fastener HL or other optional closure, plates 513, 513' may be slid into their respective compartments 521, 521', and the opening P may again be closed/latched. Said sliding the plates 513, 513' fully into their respective compartments 521, 521', may require stretching of the central panel portion 512 against the bias of elastic E to accept the full length of the plates 513, 513 and to close the opening P. However, if the plates are shorter than the full length of the panel portion 512, the elastic E will maintain the portion 512 in a somewhat shortened configuration, to match the length of the plates 513, 513'. In other words, the stiffening plates 513, 513' work against the bias B1 to prevent the portion 512 from being shortened to the full extent the bias B1 (such as elastic E) would otherwise accomplish in the absence of the plates.

Therefore, a user may adjust the length of portion 512, and hence the distance from the front edge of the device to the device rear edge, by changing out the plates or cutting the plates (513', 513) to various lengths. Use of plates of various lengths will result in elastic pulling and retaining of the portion 512 to be the length of, or generally the length of, the plates. "Generally the length of" is used here to account for the fact that the portion 512 is slightly longer in many embodiments than the pockets 521, 521', due to the additional length of the neck portion at region 522, and of the ear portion at region 523. Preferably, the pockets 521, 521' extend along 70-98%, or 75-95%, or most preferably 70-80% of the length of the portion 512, and the elastic or other bias B1 is adapted to shorten the portion 512, when no opposing force such as inserted plates is applied, by at least 10%, at least 20%, and most preferably 15-25% compared to its length with no bias B1 applied. In many embodiments for dogs, bias B1 can shorten portion 512 as much as 2 inches, which can serve to pull the front edge of the device at and near the top of the dog's head rearward as much as 2 inches. Thus, multiple plates 513, 513' of various lengths may be provided or plates may be cut by the user, so the user may custom-fit the device 500 by inserting selected plates or cut plates to match the animal that will wear the device, and then the bias B1, such as the elastic, pulls the central panel portion to tighten the plate pocket subcompartments 521, 521' against the ends of the plates 51, 513', making the pocket/subcompartments a length that generally matches the custom-fit inserted plates. Typically, whatever the plate selection or cut length, the right and left plates will be of the same length, due to the typical general symmetry of the right and left sides of the animal head.

As shown by the installed device 500 of FIG. 22, portion 512 tends to bend at or near the central axis CA", so that the two plates 513, 513' lie along-side, but not over, the dog's sagittal crest that runs longitudinally along the top of the dog's head. Lying thus on each side of the crest/ridge of the dog's head, and in certain embodiments pivoting to be at an obtuse angle to each other rather than co-planar, the two plates 513, 513' tend to stay in place relative to the dog's head and to be comfortable, while still accomplishing the desired utility of preventing rolling and scrunching of the device by the dog. Having one plate on each side of the sagittal crest, separated by fabric or other soft and flexible materials, tends to keep the ear portion centered on the dog's head.

Further, by viewing FIG. 22 and its schematically-shown bias arrows, one may understand the benefits, bias, and results of the resilient stiffeners and of the length adjustment system of portion 512. Bias B1, by elastic E for example, acts parallel to the central axis CA" to shorten portion 512, which, due to the fixed connection of the ear portion to the neck portion that is secured around the animal's neck, pulls the front edge of the ear portion (and the surrounding front regions) rearward, for example, the same or about the same as the amount of said shortening of portion 512. Therefore, shortening portion 512 by means of a longitudinal adjustment system is beneficial for custom-fitting the device to a particular dog or other animal, in order to prevent the front edge (and surrounding front regions) from being in, or interfering with, the dog/animal's vision, which could be aggravating to the dog/animal. The length adjustment system helps the device to fit the animal's head, keeping the front edge of the device comfortably behind the eyes and a neat fit over the sagittal crest.

The resilient bias provided by the stiffeners, such as B2 and B3, causes the ear portion to "pop back" or "spring back" into place, even if the dog paws or otherwise pushes the ear portion to try to remove it. The bias B2, provided by a longitudinal "spine" such as plates 513, 513' is particularly important for preventing the ear portion from being pawed or pushed back off the ears; multiple plates or stronger plates may be used in this "spine", for example two stacked plates inserted on each side of the sagittal crest, for a dog that is determined or strong in his/her pawing/pushing. Bias B2, acting at least parallel and transversely to the central axis CA" and provided by stiffener(s) such as plate 513, keep the ear portion properly located and orientated on the head and help prevent interference with said location and orientation by the animal. Bias B3, acting at least parallel and transverse to the front edge (or, generally, at least parallel and transversely to the central axis CA") and provided by stiffener(s) such as strip 535, also keep the ear portion and especially the front edge properly located and orientated on the head and help prevent interference with said location and orientation by the animal.

In FIGS. 21 and 22, it may be noted that the stiffener strips 564, 566 in the neck straps are slightly distanced from the plates 513, 513' in the central panel portion 512, with fabric of the neck portion in-between. Thus, strips 564, 566 are not attached to, fixed to, or integral with plates 513, 513', and gaps G1, G1' lie between them. Also, it may be noted that the stiffener strips 535, 537 around the front edge of the ear portion are separated from the plates 513, 513', with fabric of the ear portion in-between. Thus, the strips 535, 537 are not attached to, fixed to, or integral with plates 513, 513', but gaps G2, G2' lie between them. These gaps G1, G1' G2, G2' and the flexibility of the fabric in the gaps, allows the device to flex at those gaps, for improving the fit of the device to the animal, and for allowing the animal wearing the device to move substantially naturally and comfortably. It will also be understood that other embodiments, such as those shown in FIGS. 15-19 have similar gaps between stiffeners, for similar flexibility of the device and the resulting good fit and movement and comfort of the animal wearing it.

The preferred device is made as a one-piece protector, that is, the neck portion and ear portion being integral portions of a single "main body" or "main panel" (fixed together and not disconnectable from each other), plus one or more stiffeners installed at the time of manufacturing and not typically removable, plus one or more stiffeners insertable and changeable by the user, for example, the plates in the central panel portion. The protector having removable stiffeners may be called a "one-piece" protector because the removable stiffeners typically remain inside the device during use. The protector device main body/main panel may be made of many different fabrics, for example cold weather or hot weather fabrics, breathable fabrics, water-proof or water-resistant fabrics, soft fabrics and/or smooth fabrics not likely to attract and catch cheat-grass or fox-tails, for example. Preferably, the protector device is washable with or without removal of the plates or other removable stiffeners.

In view of the above disclosure and the drawings, it will be understood that certain embodiments of the invented device may be described as: A protective device for an animal head, the device comprising: a neck portion adjustably fastenable in a neck loop for encircling an animal neck, and an ear portion connected to the neck portion at a junction at or near a longitudinal central axis of the device; the ear portion extending forward from the junction along the central axis and having right and left wings extending out transversely from the central axis and having wing outer end extremities adjustably fastenable, independently from the neck portion, to form a head loop for extending around the animal head over the animal ears. The neck portion and ear portion may be connected only at said junction, and the junction has a width transverse to the central axis that is less than 30% of the width of the neck portion and less than 30% of the width of the ear portion. The device may comprise one or more stiffened regions at or near said central axis and extending from the neck portion to near a front edge of the device, and/or one or more stiffeners at or near said central axis and extending from the neck portion to near a front edge of the device. The device may comprise stiffened regions or stiffeners on each side, but not extending across, said central axis, and extending from the neck portion to near a front edge of the device. The device may comprise a central panel portion extending along the central axis from the neck portion to a front edge of the device, wherein the central panel portion comprises at least one pocket receiving at least one longitudinal stiffener parallel to or generally parallel to the central axis, and in certain embodiments, the central panel portion is biased to be shortened to an extent limited by the length of the at least one longitudinal stiffener, for example, by elastic that pulls ends of the central panel portion toward each other, to elastically shorten the length of the central panel portion. The device may comprise at least one stiffened region or stiffener at or near the front edge of the device. Preferably, whether removed from the animal and lying flat or generally flat, or whether installed on an animal, the device features the ear portion being distanced from the neck portion on the animal, except at the junction connecting said neck portion and said ear portion. One may describe certain embodiments as a flexible fabric panel that is bendable to fit the animal, and stiffeners at or near the central axis that are bendable but resilient. One may describe certain embodiments as consisting essentially, or consisting, of a flexible fabric panel that is bendable to fit the animal and that includes said neck portion and said ear portion, fasteners to fasten said neck portion and said ear portion in said neck loop and said head loop, and elongated stiffeners at or near the central axis that are bendable but resilient. One may describe certain embodiments as consisting essentially, or consisting, of a flexible fabric panel that is bendable to fit the animal and that includes said neck portion and said ear portion, fasteners to fasten said neck portion and said ear portion in said neck loop and said head loop, elongated stiffeners parallel and near to the central axis that are bendable but resilient, and elongated stiffeners parallel to, and at or near, the front edge of the device. One may describe certain embodiments as consisting essentially, or consisting, of a flexible fabric panel that is bendable to fit the animal and that includes said neck portion and said ear portion, fasteners to fasten said neck portion and said ear portion in said neck loop and said head loop, elongated stiffeners parallel and near to the central axis that are bendable but resilient, and elongated stiffeners parallel to, and at or near, the front edge of the device, and a width adjustment system for reducing the width of the ear portion preferably at or near the rear of the ear portion. One may describe certain embodiments as consisting essentially, or consisting, of a flexible fabric panel that is bendable to fit the animal and that includes said neck portion and said ear portion, fasteners to fasten said neck portion and said ear portion in said neck loop and said head loop, elongated stiffeners parallel and near to the central axis that are bendable but resilient, and elongated stiffeners parallel to, and at or near, the front edge of the device, a width adjustment system for reducing the width of the ear portion, and a length adjustment system comprising a bias member for shortening the length of the device at or near the central axis. The neck portion may comprise two neck straps extending out from the central axis and having hook and loop fastener at ends of said neck straps, and the ear portion may comprise two generally triangular wings having hook and loop fastener at ends of said wings.

In view of the above disclosure and the drawings, it will be understood that certain embodiments of the invented device may be described instead as: A protector device for being worn on an animal's neck and head and ears, the device comprising: a panel comprising a neck portion bendable and fastenable in a neck loop around the animal's neck, and a head portion bendable and fastenable around the animal's head including the ears in a head loop; the head loop being spaced from the neck loop except at a connection junction at a top of the neck loop and head loop; and the panel having at least one stiffened region and at least one relatively-less-stiff region, the at least one stiffened region comprising a stiffened spine region extending longitudinally from near a front edge of the device to near a rear edge of the device along the top of the head loop and neck loop. The at least one stiffened region may comprise a stiffened front edge region substantially around the front edge of the head portion. The at least one stiffened region may comprises a stiffener strip or plate connected to the panel. The at least one stiffened region may comprise removable stiffener plates/strips, for example, the stiffened spine region may comprises removable stiffener plates.

Although this invention has been described above with reference to particular means, materials and embodiments, it is to be understood that the invention is not limited to these disclosed particulars, but extends instead to all equivalents within the broad scope of the following claims.

The invention claimed is:

1. A protective device for an animal head including animal ears, a lower jaw, and a neck, the device having a front edge, a rear edge, a longitudinal central axis between the front edge and rear edge, and a width transverse to the central axis, the device comprising:
a rear portion comprising a right neck strap and a left neck strap each having an inner end at said central axis and an outer end, and each of the neck straps extending out transversely from the central axis, so that a right strap axis extending from said central axis to the outer end of the right neck strap and a left strap axis extending from said central axis to the outer end of the left neck strap are each perpendicular to the central axis, and the right and left neck strap are fastenable in a neck loop for encircling the animal neck behind the animal ears; and
a front portion having right and left wings each having an inner end at said central axis and a wing outer end, and each of the right and left wings extending out transversely from the central axis, so that a right wing axis extending from said central axis to the wing outer end of the right wing and a left wing axis extending from said central axis to the wing outer end of the left wing are each perpendicular to the central axis, and the right and left wings being fastenable to form a head loop for encircling the animal head over the animal ears and under the lower jaw of the animal; wherein the head loop is longitudinally distanced forward from the neck loop except at a junction that connects a rear edge of the front portion to a front edge of the rear portion;
wherein, in use on an animal head, the protective device is oriented so that the central axis is in an upward position and extends longitudinally along a top region of the animal head, the right neck strap and left neck strap extend down from the central axis and are fastened under the animal neck, and the right wing and the left wing extend down from the central axis and down over the animal ears and are fastened under the lower jaw of the animal.

2. The device as in claim 1, wherein the head loop is forward of the neck loop and not overlapping the neck loop.

3. The device as in claim 1, wherein the rear portion has a width, and the front portion has a width, and the junction has a width, and said rear portion and front portion are connected only at said junction, wherein the width of the junction is less than 30% of the width of the rear portion and less than 30% of the width of the rear portion.

4. The device as in claim 1, further comprising one or more stiffened regions or stiffeners at or near said central axis and extending from the rear portion to near the front edge of the device.

5. The device as in claim 1, further comprising stiffened regions or stiffeners on each side, but not extending across, said central axis, and extending from the rear portion to near the front edge of the device.

6. The device as in claim 1, further comprising a central panel portion extending along the central axis from the rear portion to the front edge of the device, wherein the central panel portion comprises at least one pocket receiving at least one longitudinal stiffener parallel to or generally parallel to the central axis, and wherein said at least one longitudinal stiffener has a length.

7. The device as in claim 6, wherein said central panel portion is biased longitudinally to be shortened to an extent limited by the length of the at least one longitudinal stiffener.

8. The device as in claim 6, wherein the central panel portion has a length and the device further comprises elastic that pulls ends of the central panel portion toward each other, to elastically shorten the length of the central panel portion.

9. The device as in claim 1, the front portion having a width transverse to the central axis, and a width adjustment system for reducing the width of the front portion.

10. The device as in claim 1, wherein the device comprises a flexible fabric panel that is bendable to fit the animal, and elongated stiffeners at or near the central axis that are bendable but resilient.

11. A protective device for being worn on an animal neck and head having ears and lower jaw, the device comprising:
a panel having a longitudinal central axis extending between a front edge of the panel and a rear edge of the panel, the panel comprising a neck portion and an ear portion, wherein, when the panel is in a flat configuration, the ear portion is entirely forward of the neck portion;
the neck portion comprising two elongated neck straps each having a neck strap outer end, each elongated neck strap extending transversely away from the central axis and having a transverse axis between the central axis and the neck strap outer end that is perpendicular to the central axis; and
the ear portion comprising two wings each having an outer wing end, each wing extending transversely away from the central axis and having a transverse wing axis between the central axis and the wing outer end that is perpendicular to the central axis, and wherein, in an installed configuration on the animal neck and head and ears, the panel is positioned with the central axis extending longitudinally on top of the animal head, and the two elongated neck straps are bendable down from the central axis and under the neck and adjustably fastenable in a neck loop around the neck behind the ears that has a neck loop diameter, and the two wings are bendable down from the central axis, over the ears and under the lower jaw and adjustably fastenable in a head loop around the animal head over the ears.

12. The device as in claim 11, wherein the panel has at least one stiffened region and at least one relatively-less-stiff region, the at least one stiffened region comprising a stiffened spine region extending longitudinally from near a front edge of the device to near a rear edge of the device, so that when in the installed configuration, the stiffened spine region extends along the top of the head loop and neck loop.

13. The device as in claim 12, wherein said stiffened spine region comprises a stiffener strip or plate connected to the panel at or near a longitudinal central axis of the panel.

14. The device as in claim 12, wherein said stiffened spine region comprises removable stiffener strips or plates on each side of a longitudinal central axis of the panel.

15. The device as in claim 11, the ear portion having a width transverse to the central axis, and a width adjustment system for reducing the width of the ear portion.

16. The device as in claim 11, having a length along the longitudinal central axis, and a length adjustment system comprising a bias member for shortening the length of the device at or near the central axis.

17. The device as in claim 11, further comprising a central panel portion extending along the longitudinal central axis of the panel, wherein the central panel portion comprises at least one pocket removably receiving at least one longitudinal stiffener parallel to or generally parallel to the central axis.

18. The device as in claim 17, wherein said central panel portion is biased longitudinally to be shortened to an extent limited by the length of the at least one longitudinal stiffener.

19. The device as in claim 17, wherein the device further comprises elastic that pulls ends of the central panel portion toward each other, to elastically shorten the length of the central panel portion.

20. The device of claim 11, wherein the two elongated neck straps comprise hook and loop fasteners.

21. The device of claim 11, wherein the two wings comprise hook and loop fasteners.

22. The device as in claim 11, wherein the ear portion has a transverse width between the outer wing ends of the two wings, the neck portion has a transverse width between the neck strap outer ends of the two elongated neck straps, and a front edge of said neck portion is connected to a rear edge of said ear portion at a connection that has a transverse width smaller than the ear portion transverse width and the neck portion transverse width.

23. The device as in claim 22, wherein the connection transverse width is less than 30% of the transverse width of the ear portion and less than 30% of the transverse width of the neck portion.

24. A protective device for being installed on an animal neck and an animal head having animal ears, the device having a front edge, a rear edge, a longitudinal central axis between the front edge and rear edge, and a width transverse to the central axis, the device comprising:
a rear portion having right and left rear portion outer ends and a right rear portion transverse axis between the central axis and the right rear portion outer end and a left rear portion transverse axis between the central axis and the left rear portion outer end, wherein said right rear portion transverse axis and said left rear portion transverse axis are perpendicular to the central axis, the rear portion ends being fastenable to each other to form the rear portion into a neck loop for encircling the animal neck behind animal ears; and a front portion having right and left front portion ends and a right front portion transverse axis between the central axis and the right front portion end and a left front portion transverse axis between the central axis and the left front portion, wherein said right front portion transverse axis and said left front portion transverse axis are perpendicular to the central axis, the front portion ends being fastenable to each other to form the front portion into a head loop for encircling the animal head over the animal ears; wherein, when in an installed configuration, on the animal neck and animal head, with the front portion ends fastened together and the rear portion ends fastened together, the head loop is forward of the rear loop, and the fastened front portion ends are forward of the fastened rear portion ends; and
wherein the neck loop has a neck loop diameter, and the head loop has a head loop diameter that is substantially the same as the neck loop diameter.

25. The device of claim 24, wherein, in the installed configuration, said fastened front portion ends and said fastened rear portion ends are spaced apart to form a gap between said fastened front portion ends and said fastened rear portion ends and between lower regions of the head loop and the neck loop.

26. The device of claim 24, wherein the rear portion ends comprise hook and loop fastener.

27. The device of claim 24, wherein the front portion ends comprise hook and loop fastener.

28. The device as in claim 24, wherein the front portion has a transverse width between the front portion ends, the rear portion has a transverse width between the rear portion ends, and a front edge of said rear portion is connected to a rear edge of said front portion at a connection that has a transverse width smaller than the front portion transverse width and the rear portion transverse width.

29. The device as in claim 28, wherein the connection transverse width is less than 30% of the transverse width of the front portion and less than 30% of the transverse width of the rear portion.

* * * * *